US012808220B2

(12) United States Patent
Ramsey et al.

(10) Patent No.: US 12,808,220 B2
(45) Date of Patent: Nov. 24, 2026

(54) HURRICANE ASSET PROTECTION SYSTEM FOR PREPARING REAL ESTATE, VEHICLES, AND OTHER TANGIBLE PROPERTY FOR NATURAL AND MANMADE CALAMITIES AND THEIR AFTERMATH

(71) Applicants: Marcus S Ramsey, Noblesville, IN (US); Olivia E Johnson, Nobleville, IN (US); John D Rutchison, Anderson, IN (US)

(72) Inventors: Marcus S Ramsey, Noblesville, IN (US); Olivia E Johnson, Nobleville, IN (US); John D Rutchison, Anderson, IN (US)

(*) Notice: Subject to any disclaimer, the term of this patent is extended or adjusted under 35 U.S.C. 154(b) by 225 days.

(21) Appl. No.: 18/372,070

(22) Filed: Sep. 23, 2023

(65) Prior Publication Data

US 2024/0301713 A1 Sep. 12, 2024

Related U.S. Application Data

(63) Continuation-in-part of application No. 16/679,232, filed on Nov. 10, 2019, now Pat. No. 11,801,406.

(51) Int. Cl.
*E04H 9/14* (2006.01)
*H04W 4/029* (2018.01)

(52) U.S. Cl.
CPC .............. *E04H 9/14* (2013.01); *H04W 4/029* (2018.02)

(58) Field of Classification Search
CPC .... E04H 9/00; E04H 9/04; E04H 9/14; E04H 9/16; H04W 4/029
See application file for complete search history.

(56) References Cited

U.S. PATENT DOCUMENTS 5,579,794 A * 12/1996 Sporta ................ E04B 1/34347 135/90
5,791,090 A * 8/1998 Gitlin ........................ E04H 9/14 52/DIG. 12
5,860,251 A * 1/1999 Gleich ...................... E04H 9/16 52/DIG. 14
6,865,852 B2 * 3/2005 Gower ...................... E04H 9/14 52/506.01
8,146,298 B2 * 4/2012 Bush ......................... B32B 5/22 428/116
11,801,406 B2 * 10/2023 Paull ........................ C12N 9/22
11,808,044 B1 * 11/2023 Hinojosa .................. E04D 5/04
(Continued)

*Primary Examiner* — Chi Q Nguyen
(74) *Attorney, Agent, or Firm* — Ritchison Law Olffices, OC; John D Ritchinson

(57) ABSTRACT

A Hurricane Asset Protection System for protecting residential, commercial and governmental structures and high cost/value objects made of a tarp/canvas cover fully encases the structure and sealed with corner tape, a reinforcing mesh, an approximately 2 pond per cubic foot spray foam at a thickness of approximately 2 to 12 inches, multiple hold down straps encircling the foam, a series of anchors, and a pre spray release coating a set of corner bands whereby the system, broadly considered, can be individually installed into a position to completely isolate a free standing structure from an external fire and can be readily customized to fit varying size structures which can reduce or prevent damage to a free standing structure and its contents from an hurricane and accompanying high velocity debris.

17 Claims, 19 Drawing Sheets

(56) References Cited

U.S. PATENT DOCUMENTS

| | | | | |
|---|---|---|---|---|
| 2005/0166468 | A1* | 8/2005 | Pierce | E04H 9/14<br>52/23 |
| 2010/0269444 | A1* | 10/2010 | Gulbrandsen | E04B 9/045<br>52/506.09 |
| 2015/0300035 | A1* | 10/2015 | Morta | E04B 1/942<br>52/27 |
| 2020/0147423 | A1* | 5/2020 | Paull | C12N 15/111 |
| 2023/0220643 | A1* | 7/2023 | Beers | E04H 9/145<br>405/111 |

* cited by examiner

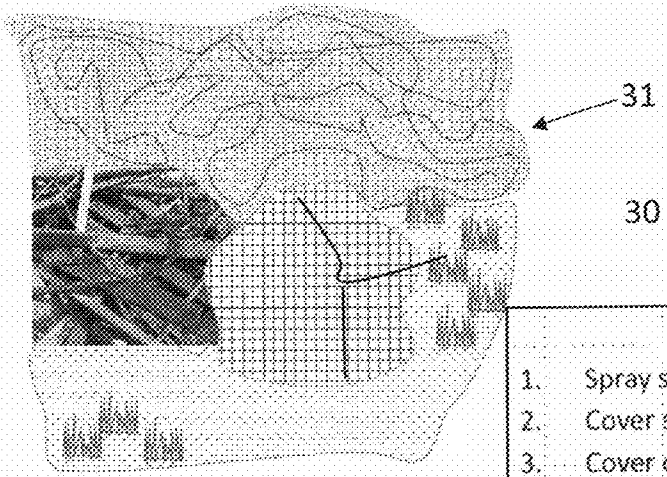

Fig. 1 A

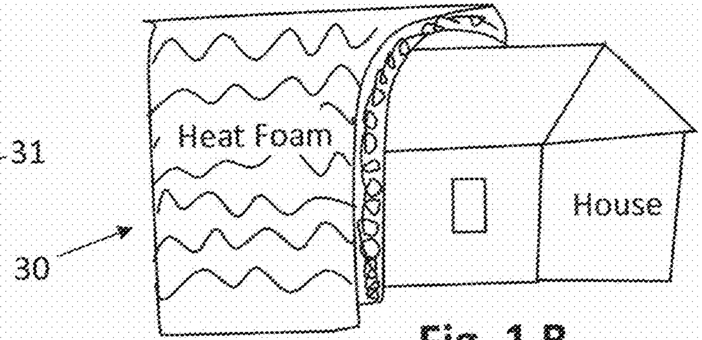

Fig. 1 B

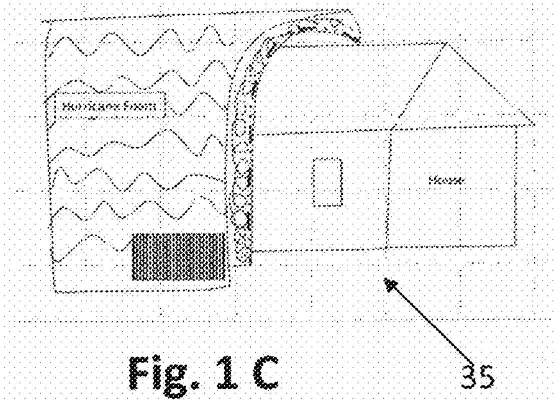

Fig. 1 C

Method of Hurricane Proofing Buildings

1. Spray structure with release agent (optional)
2. Cover structure with heat reflective layer (tarp or roll)
3. Cover corners with wide seal tape if needed
3A. Encase tarp with mesh strength wrap – optional
3B. Install release flap/ valve to equalize pressure in/ out - optional
4. Secure reflective layer with straps
5. Attach ground straps to ground anchors
6. Spray-on approximately 2 to 12 inches fire protective foam – 2 lb per cu ft
7. Prod/ press pole into window frames, soffits, under-hangs etc. as foam cures and sets-up
7A. Spray on alternative intumescent coating/foam - optional
7B. Roll-on Alternative Heat retardant coating - optional
8. Post storm – remove foam
9. Unsecure ground straps from anchors
10. Remove anchors
11. Remove reflective tarp/later
12. Pressure spray surface to remove residue if needed

62

Fig. 1 D

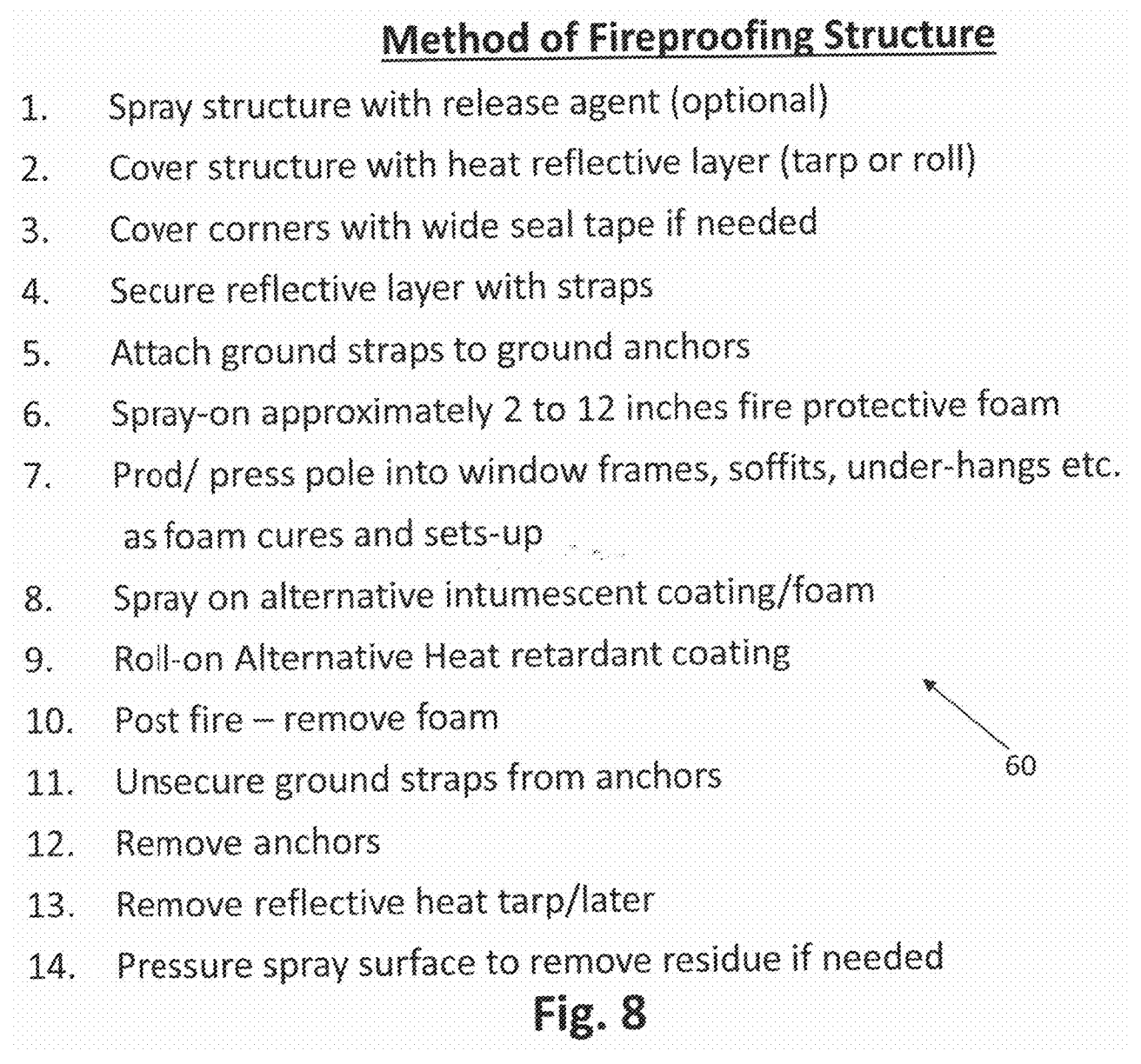

Method of Fireproofing Structure

1. Spray structure with release agent (optional)
2. Cover structure with heat reflective layer (tarp or roll)
3. Cover corners with wide seal tape if needed
4. Secure reflective layer with straps
5. Attach ground straps to ground anchors
6. Spray-on approximately 2 to 12 inches fire protective foam
7. Prod/ press pole into window frames, soffits, under-hangs etc. as foam cures and sets-up
8. Spray on alternative intumescent coating/foam
9. Roll-on Alternative Heat retardant coating
10. Post fire – remove foam
11. Unsecure ground straps from anchors
12. Remove anchors
13. Remove reflective heat tarp/later
14. Pressure spray surface to remove residue if needed

60

Fig. 8

Two
101
One
101

US 5,423,150
Three
Four
102

Prior Art US 3,715,843
106

High Cost/ Value Assets difficult to move

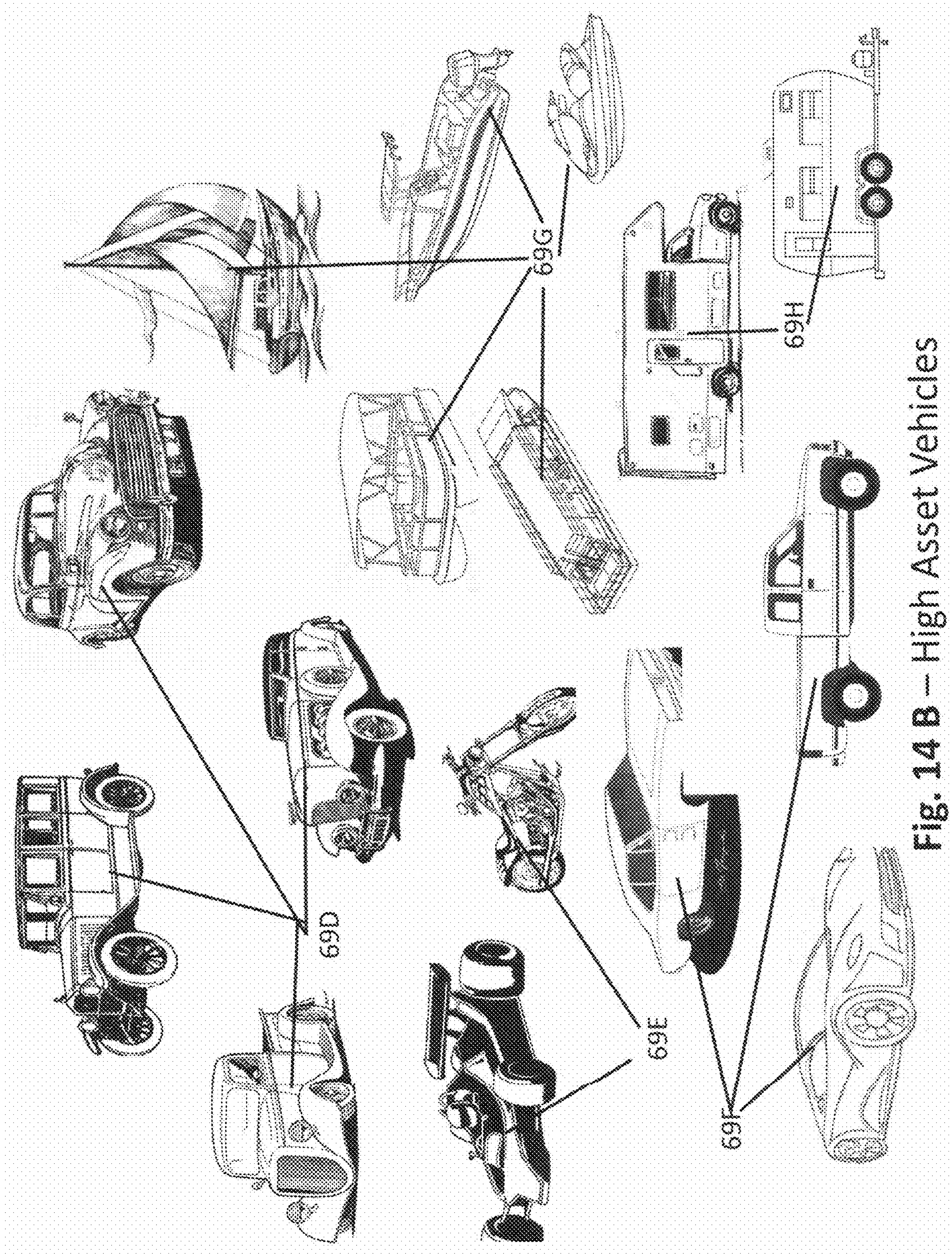
Fig. 14 B – High Asset Vehicles

Examples covering objects

Method of Hurricane Proofing Buildings

1. Spray structure with release agent (optional)
2. Cover structure with plastic/ canvas tarp or heat reflective layer (tarp or roll)
3. Cover corners with wide seal tape if needed 3A. Encase tarp with mesh strength wrap – optional 3B. Install release flap/ valve to equalize pressure in/ out - optional 4. Secure reflective layer with straps
5. Attach ground straps to ground anchors
6. Spray-on approximately 2 to 12 inches fire protective foam – 2 lb per cu ft
7. Prod/ press pole into window frames, soffits, under-hangs etc. as foam cures and sets-up 7A. Spray on alternative intumescent coating/foam - optional 7B. Roll-on Alternative Heat retardant coating - optional 8. Post storm – remove foam
9. Unsecure ground straps from anchors
10. Remove anchors
11. Remove reflective tarp/later
12. Pressure spray surface to remove residue if needed

62

Fig. 15A

Method for Hurricane Proofing Buildings

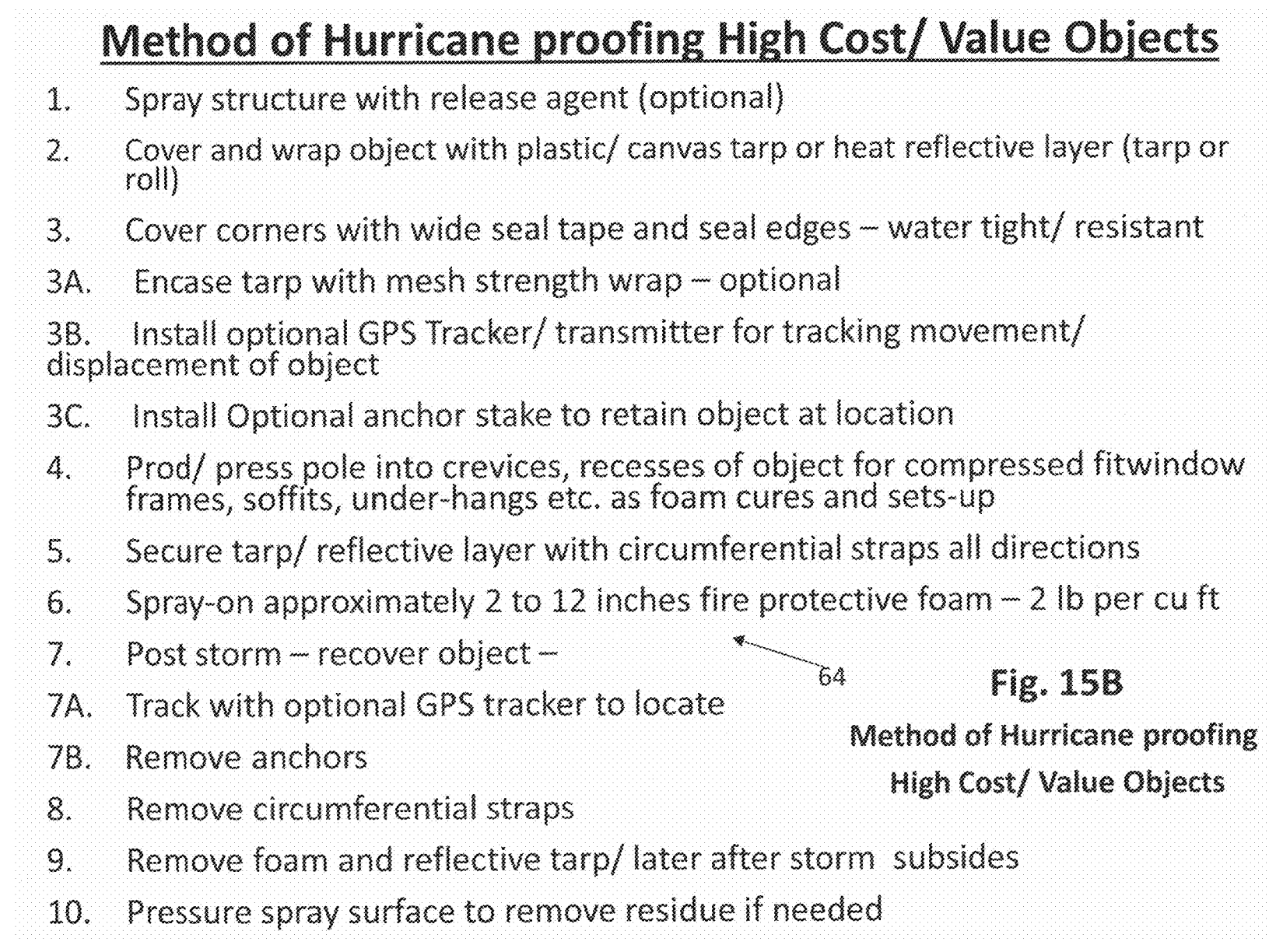

Method of Hurricane proofing High Cost/ Value Objects

1. Spray structure with release agent (optional)
2. Cover and wrap object with plastic/ canvas tarp or heat reflective layer (tarp or roll)
3. Cover corners with wide seal tape and seal edges – water tight/ resistant 3A. Encase tarp with mesh strength wrap – optional 3B. Install optional GPS Tracker/ transmitter for tracking movement/ displacement of object 3C. Install Optional anchor stake to retain object at location 4. Prod/ press pole into crevices, recesses of object for compressed fitwindow frames, soffits, under-hangs etc. as foam cures and sets-up
5. Secure tarp/ reflective layer with circumferential straps all directions
6. Spray-on approximately 2 to 12 inches fire protective foam – 2 lb per cu ft
7. Post storm – recover object –

7A. Track with optional GPS tracker to locate

7B. Remove anchors

8. Remove circumferential straps
9. Remove foam and reflective tarp/ later after storm subsides
10. Pressure spray surface to remove residue if needed

64

Fig. 15B

Method of Hurricane proofing High Cost/ Value Objects

HURRICANE ASSET PROTECTION SYSTEM FOR PREPARING REAL ESTATE, VEHICLES, AND OTHER TANGIBLE PROPERTY FOR NATURAL AND MANMADE CALAMITIES AND THEIR AFTERMATH

CROSS-REFERENCE TO RELATED APPLICATIONS

This Continuation-In-Part (CIP) application that is filed under 37 CFR 1.53(b) and claims the benefit of United States Non-Provisional Patent Application with Ser. No. 16/679,232 which was filed Nov. 10, 2019, by Lee D. Paull and Marcus S. Ramsey. The application was originally entitled a "Special Fire Protection System for Runaway Grass and Forest Fires and Method for Use." The parent application is an allowed application but is not issued as a patent. Marcos Ramsey is the common inventor, and he is now joined by O. Johnson and J. Ritchison as the three inventors for this application.

FIELD OF INVENTION

This invention relates to a Hurricane Asset Protection System for preparing real estate, vehicles, and other tangible property from natural and manmade calamities and their aftermath. Simply stated it is related to high wind/hurricane storms and fire protection systems for real estate structures, expensive and difficult property objects to move when a calamity and storm arises, property like vehicles (cars, trucks, trailers, boats and jet ski units, recreational vehicles, motorcycles, statues, and the like). The embodiments herein are particularly related to hurricane, flood, and fire protection devices and accessories used for protecting building structures as well as expensive, difficult objects/personal property with short notice to the owners. The embodiments herein are more particularly related to protection sheets and insulating blankets with foam used for protecting the example assets. The protection is accomplished without direct modification and physical attachments to the assets-either the building structure or other personal property that is difficult to move. More particularly, the present invention relates to a system for a hurricane resistant covering that can be quickly deployed over buildings and other property objects when confronted with an approaching natural or manmade disaster. This can permit insurance companies and others to protect the loss of the asset and remove the wrap after the hurricane or calamity has passed.

Furthermore, the present disclosure relates to a system and method of use for a system that protect real estate and other tangible property objects from damage or combustion when exposed to hurricanes or to a natural or manmade disaster like extremely high wind, uncontrolled floods, fires, rain, sleet, ice, and snow. It also can discourage looting and theft of property during the aftermath of a natural or man-made disaster. This is a design of a system for emergency deployment in the event of approaching hazardous conditions, especially rapidly moving disasters with short notice. The present invention relates generally to an asset protection isolation and covering system for free standing real estate structures and buildings, as well as vehicles which are difficult to prepare and move with short notice. More particularly, the present invention relates to a system for a storm-resistant building cover which can be employed as well for other structures, residential and commercial.

The disclosures made herein relate generally to a system and a combination of devices for protecting homes, buildings, and other assets from wind damage. It is related particularly to a system for protecting homes and other assets from the destructive forces of high winds from hurricanes, tornadoes, cyclones, and typhoons. The system is used to protect the underlying structure or asset during periods of high winds, as well as used as a means of deflecting flying debris from windows and doors and preventing damage and broken windows, etc. The threats to life, health, and property and the magnitude of damage that can be caused by high winds on buildings, homes, boats, automobiles and other high value, tangible assets are well understood by property owners and insurers, particularly in the aftermath of the hurricanes in Florida and Louisiana.

This is a hurricane protection system which is designed to prevent the destruction of tangible assets in high winds by securing the asset to the ground, making it trackable, and insulating the object or structure from high impact debris often accompanying the high winds. It is a hurricane protection system which provides a protection system that is configured to extend over the top and sides of a building, thereby anchoring the building to the ground, holding the building to its foundation, and preventing structural and sheathing members from detaching from the building in high winds. This is a hurricane protection system that provides a plurality of ground anchors for fixing the asset to the ground, a hurricane protection apparatus that provides a shield-like wrap and polymer/foam for deflecting flying debris away from windows, doors, and other sensitive areas. The hurricane protection system is anticipated to be quickly assembled and installed when needed then removed when the threat subsides. Such a hurricane protection system would be useful and novel.

FEDERALLY SPONSORED RESEARCH

None.

SEQUENCE LISTING OR PROGRAM

None.

BACKGROUND—FIELD OF INVENTION AND PRIOR ART

As far as known, there are no Hurricane Asset Protection System for preparing real estate, vehicles, and other tangible property from natural and manmade calamities and their aftermath. It is believed that this protection system and method of use are unique in their design and technologies. This is background is to one type of calamity—a fast moving brush fire. The principals discussed have similar impact for other storm related situations such as hurricanes and high velocity winds and debris. It is well known that a basic concern in protecting a building structure from an approaching fire, or other disaster such as high velocity hurricane winds, is the ability to deploy a resistant material or blanket quickly and effectively around the entire structure. This protection needs to be deployed before a hurricane or fire arrives. Often there is little warning of an approaching fire, particularly if the threatening fire spreads at night or while an occupant is away from his home. Even if a homeowner is present, the rapid movement of fire storms driven by high winds can still result in extensive property damage before conventional, precautionary measures, like shutters and plywood coverage, can be completed. Without the ability to quickly, completely, and sometimes automatically deploy a fire or wind protection system, the building structure may quickly succumb to the approaching fire or impact from high winds. Other storms may be more predictable. Hurricanes and floods (unlike fires and tornadoes) may have more of a warning period even though the exact path of the storm is not specifically known. It is deemed desirable to develop a hurricane and asset protection system protection system that does not expose a person or persons to the dangers of an approaching calamity such as hurricanes and floods. Thus, the ability to quickly deploy the Hurricane Asset Protection System for preparing real estate, vehicles, personal property and other tangible property (with high replacement costs or sentimental value) from natural and manmade calamities and their aftermath is a primary goal of this invented system which to date has been inadequately addressed by other prior art.

Storms such as hurricanes, floods, and fires, are fierce storms that can affect large acreages and result in destruction of households, businesses, buildings, industrial plants, or other structures. Storms can also devastate forests, pastures, or parks as well. They often result in great personal tragedies and natural disasters as well can result in immense economic losses. These storms can be caused by or connected with lightning, rain, ice and hailstorms, firestorms, earthquakes, hurricanes, tornadoes, natural causes, and causes from human negligence or arson. Many of these calamities spread quickly and become uncontrollable. Fires, for example, burn an average of 5 million acres of prairie and woodlands every year in the U.S. alone. Some fires start naturally from lightning, and some are the result of arson or of carelessness by hikers or campers. Once a wildfire starts, it can advance quickly at a velocity of about 6.8 mph in forests and up to 14 mph in grasslands. Additionally, the winds from these fires can carry embers far ahead of the fire line and start new fires elsewhere. The rate of spread depends on the availability of dry grass or wood, topography, wind speed, ambient temperature, and humidity. The direction of spread of a fire can be influenced not only by the distribution of fuel but by the wind. Accordingly, some fires change direction abruptly and threaten structures with little warning. Hurricane watches are similar, albeit hurricanes and tropical storms can have a longer period when the event is predicted. However, the size and movement are not predictable, and the path and severity of the storm can change often before the location of the landfall actually occurs.

Every year free standing structures are either destroyed or endangered by out-of-control forest fires, tropical storms, and hurricanes. Forest fires burn out of control usually because they are just too large for firefighting personnel to contain. Out of control forest fires can easily destroy any free-standing fire prone structure in their path. Hurricanes can cover a vast area and can have several "paths" of destruction. Therefore, there is a need for a Hurricane Asset Protection System for preparing and protecting real estate, vehicles, and other tangible property from natural and manmade calamities and their aftermath. There is a need for a protection system that can isolate free standing, disaster-prone structures such as single-family homes from out-of-control hurricanes as well as from forest fires. It is known that certain geographical areas, particularly the gulf regions as well as California, that are prone to hurricanes, wildfires and other calamities which can rage through inhabited areas destroying residential and commercial property worth millions of dollars.

Temperatures of wildfires, for example, can, at certain points, reach 1400 degrees Celsius (C.) and can easily extend and reach temperatures over 1600 degrees C. Moreover, such fires may be caused or accompanied by winds, or wind gusts reaching up to 150 miles/hour (MPH). Whatever their origin, these fires are extremely dangerous and very hard to bring under control. Additionally, some of the fires, for example, bush or forest fires may advance at a rate of from 0.5 km/hour to more than 6 km/hour. The speed and intensity of these fires depends on the type of terrain and on weather conditions. The flames of these fires may reach heights up to 50 meters. These kinds of fires often exceed temperatures above 1600 degrees C. and, under extreme conditions, can give off 10,000 kilowatts per meter of fire front. Additionally, many of the fires end up becoming firestorms.

Hurricanes are unpredictable. The path can change in short periods. This means even with the best evacuation plans and efforts, there may still be areas impacted that were not evacuated. Assets there will depend on the protection systems placed on the assets to resist the winds, debris and rain, ice, and hail. Clearly, hurricane disasters as well as uncontrollable fires and firestorms create very dangerous and economically unsustainable conditions and problems. There is a continuing need to provide solutions to these problems. Although throughout the years attempts were made to provide solutions to these problems, to date there is no reliable, practical, and economical way to protect houses, businesses, and other structures and objects from the destruction from the hurricanes and tropical storms, the uncontrollable fires and firestorms, and the aftermath looting that follows these storms. It would therefore be advantageous to provide means for protecting housing and other structures and objects from the destruction by the natural and manmade disasters, as well as from the fires and firestorms. In addition to the fires, hurricanes and tropical storms are accompanied by high winds or other extreme conditions that further cause destruction and loss of assets. It is likely that many of these assets—real estate and other tangible property—can be protected from loss if the Hurricane Asset Protection System for preparing real estate, vehicles, and other tangible property from a natural or manmade calamities and their aftermath is utilized in preparation.

In order to protect building structures, including homes, from these uncontrolled external fires as well as high winds and gusts from hurricanes and the like, there have been numerous attempts to develop fire protection devices which can isolate the building structures from these external fires. There are needed systems and methods for enclosing the building structures from surrounding external fires or high windstorms by placing fire and wind resistant materials over building structures. The prior art devices and methods that have been suggested to date generally involve impractical, complicated deployment mechanisms and/or require external power sources for deployment which are often unavailable. Prior approaches to deployable fire protection devices depended primarily on unfurling curtains or thin sheets made of fire-retardant material to protect buildings from "sparks and flame." Such devices have several important drawbacks. Notably they are difficult and time-consuming to deploy and provide little or no temperature reduction to the structure being protected. Temperatures in a firestorm can reach in excess of the ignition point for wood and other combustibles. Therefore, maximizing the thermal barrier at the structure is essential. The time and effort required to deploy a fire-protection device is critical since in the face of an approaching firestorm, evacuation of people necessarily takes precedence over the protection of structures. The easier and faster the deployment, the higher the likelihood that the apparatus will be successfully used. Additionally, the faster such a device is in place, the quicker people can be evacuated, thereby increasing the safety margin. Therefore, the present invention represents a significant improvement over prior art.

As is known by one skilled in the art of protecting buildings and the like from damage caused by missile-like objects that are occasioned by the heavy winds of hurricanes or tornadoes, there are a few commercially available variations of hurricane protective devices, often called shutters, that fasten immediately over the frangible area to be protected. These devices are typically expensive to purchase, cumbersome to handle, made from stiff, heavy material such as steel and aircraft quality aluminum alloy or occasionally plastic with reinforcing. Many systems require the assembly to be manually connected and then later manually disassembled and removed and finally stored at each threat of inclement weather. Many prior art systems require unsightly and difficult-to-mount reinforcing bars at multiple locations. Further, these known shutters are usually opaque, preventing light from entering a shuttered area and preventing an inhabitant from seeing out. It is desirable that police be able to see into buildings to monitor and check for inhabitants and to prevent looting-which can be a problem in such circumstances. Missiles, even small not potentially damaging missiles, striking these heretofore known shutters create a loud, often frightening bang that is disturbing to inhabitants being protected.

There are standardized testing required for these protective devices to meet certain standards of strength and integrity. These standards are evolving and have been introduced for various utilizations and locales. To qualify for use where said testing requirements apply, the strength and integrity characteristics of these protective devices must be predictable and must be sufficient to meet said standards. Additionally, and as is obvious to one skilled in the art, it is beneficial to qualify for said standards even in situations in which standards do not apply. As a result of these standards, many undesirable aspects of prior art such as shutters and other systems have been acerbated. Shutters, for example, have become more cumbersome, more bulky, heavier, more expensive, more difficult to store, and remain generally opaque and noisy when impacted. To incorporate sufficient strength to meet said requirements, weight and bulk have emerged as a problem for structures with over six feet in span. The useable span (usually height) of the heretofore known shutters that meet said standards may be limited to eight feet or less. This makes protecting large windows, for example, or groupings of windows, with the heretofore known devices cumbersome, expensive, and impractical. Devices that are intended to be deployed in a roll down manner either manually, automatically, or simply by motor drive, have also been difficult to strengthen sufficiently to pass the test requirements and require unsightly reinforcing bars every few feet.

Prior to the introduction of said standards, an ordinary consumer had very little useful knowledge of the strength and integrity of said shutters. It is believed shutters of the pre-standard era were so weak that all these older systems would fail the present standardized testing. The current standards are not intended to provide a shutter that protects structures in all situations. As the hurricane conditions can be very violent and destructive, the standards are not intended to require strength and integrity sufficient to protect in all circumstances. The standards simply provide a benchmark as to strength and integrity. Said strength and integrity of the shutters can now be measured.

There are Standards/testing for hurricane resistant materials and systems. Properly testing hurricane proof building materials to make sure they meet the proper standards is crucial. The most common test for the hurricane market is the impact and cycling test, designed to simulate windborne debris striking a window or element of the building during a hurricane. Providing protection from flying debris and breaching the building envelope is critical. If a structure's envelope is breached, wind will enter the building, creating pressure changes that can lead to the destruction of both the contents of the building and the building structure itself. Additionally, a breached opening can allow water into the building causing water damage throughout. Impact and cycling tests are designed to simulate the hurricane act of flying debris and the rapid increase and decrease in pressure. The weakest links in a building envelope are windows, doors, and roofs. For windows and doors, the impact test consists of firing a 2×4 projectile at predetermined locations. The cycling portion of the test is conducted after the impact test with no penetrations and consists of 9,000 cycles of positive and negative pressures. Common hurricane tests are:

1. Hurricane testing on doors, curtain walls, windows, shutters, roofs
2. Missile and Cyclic window pressure
3. Air, Water, and Structural testing
4. Florida Product Approval requirements
5. Miami-Dade Notice of Acceptance requirements There are a sundry of patents that teach the utilization of knitted or woven fabric such as netting, tarpaulins, drop cloths, blankets, sheets wrapping and the like for anchoring down recreational vehicles, nurseries, loose soil and the like. But none of these are intended for, nor can withstand the forces of the missile-like objects that are carried by the wind in hurricanes.

Problem Solved

The improvement and problem solved as to hurricane and high wind gusts and fire protection systems naturally evolve from the background of the overall condition of hurricanes and wildfires as described above. Every year free standing structures, vehicles, boats, recreation vehicles, statues, cell towers, and many other physical assets are either destroyed or endangered by hurricane winds and the out-of-control fires. The hurricane damages as well as wildfires are out of control. Preparation in the past has been too complex or too expensive. Therefore, there is a need for a Hurricane Asset Protection System for preparing real estate, vehicles, and other tangible property from a natural calamity and to discourage looting and theft of property during a natural or manmade disaster like extremely high wind, uncontrolled floods, fires, rain, sleet, ice, and snow of a natural calamity and to discourage looting and theft of property.

There are also needs to provide hurricane and fire protection with a simple and reliable deployment system that does not rely on any external power source; and provide a fast and effective method of quickly enveloping a building structure from high winds or from an external fire. Hence, there is a need for improved and improved techniques for protecting structures (and, more generally, all objects that are high cost or high value objects) from hurricane destruction and damage as well as from fire. Numerous innovations for hurricane protection as well as fire protection systems and devices have been provided in the prior art and are addressed below. Even though these innovations may be suitable for the specific and narrow individual purposes to which they address, they differ from the present invention as hereinafter contrasted.

As far as known and believed, there is no S Hurricane Asset Protection System like the current proposition. It is believed that this system is unique in its design and technology. A novelty search revealed:

A. U.S. Pat. No. 3,715,843 by Ballinger was issued in 1973 for a Protection Apparatus for a Building. It teaches a fire-resistant apparatus for covering and enclosing a building for protecting it from airborne firebrands, or the like, produced by a high-velocity fire storm. The enclosing apparatus includes flexible, thin-sheet cover means of fire-resistant or fire-retardant material which is usually in the form of several panel portions and a protective fire-retardant cover interposed between the panels that is easily assembled and mounted in protective relationship over a building by a small crew of men when the building is threatened by an approaching fire storm. Next, B. a U.S. Pat. No. 4,858,395 by McQuirk was issued in 1989 for Fire Protection for Structures. It demonstrated a fire protection device for a structure using a fire-resistant sheet material compacted in a folded condition in a housing on the roof of the structure so that when deployed from the housing it can be unfolded to quickly envelop the structure. After that, C. a U.S. Pat. No. 4,994,317 by Dugan et al. was issued in 1991 for a Flame Durable Fire Barrier Fabric. This provides a fabric suitable for use as a flame barrier fabric comprising a flame durable textile fabric substrate, a flexible silicone polymer layer which stays intact, maintains its integrity on exposure to a flame and is carried by the surface of the textile fabric substrate, and a reflective flame durable paint coating carried by the silicone polymer coating. Next, D. a U.S. Pat. No. 5,047,449 by Pastureau was issued in 1991 for Fire Protection Material. Here is shown a material characterized in that it is flexible, employs simultaneously the two phenomena of in tumescence and endothermicity to obtain optimal protection characteristics maintaining the element to be protected at a temperature below or in the order of 150 degrees C. when it is subjected to thermal attack corresponding to a flame temperature of 700 to 1000 degrees for a duration of at least one hour and for a thickness of the material between 10 and 20 millimeters.

E. A U.S. Pat. No. 5,423,150 by Hitchcock was issued in 1995 for an Automated Exterior Fire Protection System for Building Structures. It exemplifies an automated exterior fire protection system that deploys a fire-resistant blanket that is stored under the roof of the structure. Threatening fires are detected by a sensor to provide a signal that initiates automatic deployment of the blanket. F. Next a U.S. Pat. No. 5,608,992 by Floyd was issued in 1997 for a Fire-Resistant House Cover. It is a fire isolation device for a free-standing structure. This device includes a left tarp and right tarp fabricated from a fire-resistant material. The left tarp and right tarp are of a size to completely enclose the free-standing structure. G. A U.S. Pat. No. 5,860,251 by Gleich was issued in 1999 for a Rapidly Deployable Fire Protection Apparatus. It profiles a fire-resistant flexible dome apparatus for covering and protecting buildings, goods, livestock, persons, and other objects from a fire, especially a rapidly moving conflagration known as a "fire storm." The apparatus is a dome-like structure made of fire-retardant fabric, supported with air or gas pressure within integral tubes radially disposed about the central axis, or between one or more layers of said fire resistant fabric. Its ground-contacting periphery is manually secured to the ground. One embodiment is provided to add an improved ground seal and added anchoring to ground to help maintain structural integrity. Air or gas pressure may be provided by several means including compressed gas, mechanical air movement or chemical devolution. Then, H. a U.S. Pat. No. 5,931,233 by La Bonte, et al. was issued in 1999 for a Twp-Phase Fire Suppression/Protection Method for Structures and Surrounding Grounds. It is a two-phase fire suppression/protection method and system for structures and surrounding grounds includes a Phase 1 and a Phase 2. Phase 1 is initiated first when a plurality of parabolic microphone sensors placed at the perimeter of the grounds surrounding the structure detect sound associated with an advancing wildfire. The distribution units generate a dome of high pressure, cool air which encapsulates the structures and surrounding grounds for impeding the approach of the wildfire. Phase 1 also employs a set of fog jet nozzles which atomize water under high pressure to produce a cool fog dispersion pattern which provides complete wide area wetting and is sufficient to create, by air displacement, a high-pressure envelope surrounding the structure. Phase 2 is initiated as the approaching flames are detected by additional sensors including smoke/particulate, thermal, and infrared sensors. Phase 2 employs a set of spiral jet nozzles which are intended to create a dispersion that deluges the entire surface area of the structure with water. I. a U.S. Pat. No. 6,865,852 by Gower was issued in 2005 for a Flexible wind abatement system. It is a device for the protection of property against high winds comprising a flexible material of predetermined strength and stretch characteristics, and in the form of a panel or several panels, utilized to protect the side of a structure including its windows and doors from the strong winds and debris impacts occurring during a hurricane. The device is anchored in a manner to space it out from the area being protected according to formula provided and can safely dissipate substantial impacting energy. The preferred embodiment attaches to an overhanging eave and the ground below protecting in addition to the windows and doors, plantings, outdoor furniture, decorative shutters, downspouts, and such as are enclosed behind the barrier. Several methods of storage and deployment of said curtain are described including rolling, sliding, and converting to awning. The barrier has the added feature of acting as a tie down in certain applications. J. A US application for a patent, US20080053507A1, called a High Wind Structure Protection device was submitted by Palumbe in 2008. It described and taught a device that in high wind conditions covers objects to deflect the wind around the object, holds down the object and protects the object from windblown debris. This invention provides in one embodiment, a wind protection device for securing over a structure to anchor points in the ground. The device includes a cover having a plurality of vents and non-vent portions, as well as a plurality of attachment portions disposed on the cover and being operably configured to be attachable to the anchor points. When the device is secured over the structure, the cover forms an angle relative to the structure defining a more aerodynamic profile for the device than the structure alone, and the non-vent portions of the cover block windblown debris from impacting the structure.

K. A U.S. Pat. No. 5,968,669 by Liu et al. was issued in 1999 for a Fire-Retardant Intumescent Coating for Cellulosic Materials. It provides a fire retardant coating composition for lignocellulosic materials which comprises expandable graphite particles, an absorbent material, a polymeric binder, a carbonific material, a blowing agent, and a wetting agent. Next L. a U.S. Pat. No. 6,810,626 by Meyer et al was issued in 2004 for a Fire Protection Device for a Building Structure. It shows and teaches fire protection devices and related methods for isolating building structures from an external fire. The fire protection device includes a rolled fire-resistant protective cover having dimensions large enough to cover the building structure. The protective cover is then stored in a storage bag storing the protective cover and being disposed on an inclined top surface of the building structure. The device includes means for releasing the rolled protective cover from the storage bag so that, upon release from the storage bag, the protective cover can roll down the inclined top surface by gravity. M. A U.S. Pat. No. 7,395,869 by Schnabel, et al. was issued in 2008 for an External Structure Fire Protection System—"ESFPS". It demonstrates a barrier system for protection and resistance from externally started fires, forest fires and other fires that affect and start a structure burning from the outside inward. The barrier system comprising a specifically designed track system mounted onto the top of the structure, utilizing fire protective material hanging down the sides of the structure to create a fire-resistant enclosure. The barrier system is designed to be assembled and set up in advance on the structure in preparation of a fire. Next N. A U.S. Pat. No. 9,381,387 by Douglas was issued in 2016 for a Fire Protection Mechanism. It is a fire-protection mechanism that includes multiple, overlapping cavities that can be filled with water (and, more generally, a fluid). When the fire-protection mechanism is deployed over an object, such as a building, and the cavities are filled with water, the fire-protection mechanism reduces the likelihood that the object is damaged by the heat associated with a fire proximate to the object, such as a wildfire. In particular, the heat capacity and latent heat of the water significantly increase the thermal time constant of the object, thereby reducing the likelihood of combustion.

O. A US Patent Application Published as 2005/0022466A1 by Kish et al. in 2005 for a Fire Resistance Rating System. It is a system for building structure fire resistance that can be rated by providing a new or existing building structure; providing or having made available at least one fire control agent; applying or noting application or presence of the at least one fire control agent to or with at least one component part of the building structure; providing a rating format for fire resistance of a comparative building structure; and comparing the applying, application or presence of or with the at least one component part of the building structure to the rating format to provide a fire resistance classification rating. A multi-level rating system can be employed. P. A US Patent Application Published as 2005/0170725A1 by Kimener in 2005 for Wildfire Protection. It shows and teaches a method of protecting an asset from destruction resulting from exposure to at least one of fire and thermal energy comprising: (a) identifying a pending threat capable of at least substantially destroying an asset by exposure to at least one of fire and thermal energy; (b) deploying a barrier, that includes a fire resistant layer and a thermal energy reflective layer, to separate the asset from the pending threat; and (c) securing the barrier to at least one of the ground, the asset itself, and a support structure; (d) wherein the act of securing the barrier is operative to retain at least one of the fire resistant layer and the thermal energy shield layer between the asset and the pending threat. Q. A US Patent Application Published as 2009/0301001A1 by Kish et al. in 2009 is for a Fire Resistance Rating System. It shows that fire resistance can be rated for building structure by providing or having made available and applying or noting application or presence of fire control agent (s) to or with component part (s) of the structure; providing a fire resistance rating format of a comparative structure; and comparing for a fire resistance classification rating (FRCR). R. A US Patent Application Published as 2010/0269449A1 by Bush et al. in 2010 for Fire-Resistant Structures, Fire Resistant Insulations, and a Method for Fire Protection. It is a fire-resistant structure, fire-resistant insulations, and a method for fireproofing and fire-protection of permanent or temporary structures or objects. It measures fire-resistance for insulation and the method for fire-protection that comprises steps of providing fire-protection for structures and objects subjected to fires, brushfires, or fire storms.

S. A US Patent Application Published as 2012/0227990A1 by Burnham in 2012 for a Tractable, Fire-Resistant, Thermal-Insulated Covers and Enclosures. It deals with a set of protective covers made with fire-resistant and thermo-insulated blankets to shield diverse structures and objects from fire; inter-connective tent units forming protective surface passageways for sheltering and evacuating firemen at fire locations and for providing tactical shelter for security personnel; novel tent configurations having optimal packaging and surface coverage characteristics; and, ground-covering blankets for stopping ground-level fire and for diverse fire-fighting tactical applications. T. A US Patent Application Published as 2013/0048317A1 by Charlton in 2013 for a Fire-Retardant Delivery Method and Apparatus. A method and apparatus for delivering fire retardant to a ground fire from an aircraft. The apparatus includes a dispenser casing that dispenses fire retardant after the casing has been released from an aircraft. The apparatus includes a dispenser fuse that actuates the dispenser casing to dispense the fire retardant in response to one or more predetermined conditions. U. A US Patent Application Published as 2015/0083443A1 by Thompson in 2015 for a Method of Protecting a Structure from a Fire. A method of protecting a structure from a fire. The method comprises covering the structure with a fire-retardant liquid absorbent material and spraying fire-retardant liquid on the fire-retardant liquid absorbent material. In a second embodiment, there is a method wherein the fire-retardant liquid absorbent material is draped over with a high temperature insulation material in segments forming seams, after the fire-retardant liquid absorbent material is sprayed. A third method comprises layering a structure with a high temperature insulation material and then layering said high temperature insulation layer with a liquid absorbing layer. V. A US Patent Application Published as 2016/0047120A1 by Davis et al. in 2016 for a Fireproof Home and a Fireproof Heat Barrier Shield Structure. This provides a fireproof barrier shield comprising the panels combined to form a fireproof blanket placed on the building structure to protect the structure from flying embers, radiant heat, and fire accidents. The panel comprises an inner heat retardant layer and outer heat reflective layer secured together using a heat resistant adhesive glue or thread. Each panel has several slots for receiving a fastener for combining the panels.

As can be observed, none of the prior art has anticipated or caused one skilled in the art of fire retardant and resistant devices and systems for protecting building systems to see this new system and configuration by Ramsey as obvious to a person skilled in the ordinary art of the industry. The Hurricane Asset Protection System for preparing real estate, vehicles, and other tangible property from Natural calamity and to discourage looting and theft of property during a natural or manmade disaster like extremely high wind, uncontrolled floods, fires, rain, sleet, ice, and snow of a natural calamity and to discourage looting and theft of property. This system provides an answer to the need for protecting building structures and other physical assets from hurricane winds and high gusts. This protection of the building structure and objects is provided by quickly layering the foam and mesh with a retention and anchoring system over the structures or objects that are difficult to move. The new Hurricane Asset Protection System prevents these high velocity winds and fire from damaging the structure as well as providing an economic advantage of preserving the covered structure rather than replacing a destroyed structure.

SUMMARY OF THE INVENTION

This invention is a Special Fire Protection System for Runaway Grass and Forest Fires and Method for Use and Hurricane Asset Protection System for structural buildings and high cost/value objects. The preferred embodiment of the Special Fire Protection System is a fire protection system for protecting residential, commercial and governmental structures from runaway grass and forest fires comprised of: (a) a heat reflective cover tarp, roll-out matting, or fold out matting with reflective surface on one or both sides, the tarp is configured to fully encase the structure; (b) a fire proof spray foam—approximately 2 to 12 inches, with fire retardant additive, normally closed cell and 800 to 1400 degrees Celsius minimum resistivity, the foam is applied to fully encase the tarp; (c) multiple hold down straps, ropes, cable, etc.; (d) a prodding/push pole to tuck sprayed tarp into windows, door frames, soffits and under hangs; (e) a series of anchors-straight, augers, etc.; (f) a pre spray release coating (optional); and (g) a set of corner bands (optional) wherein the system, broadly considered, can be individually installed into a position to completely isolate a free standing structure from an external fire. The heat reflective tarp may be manufactured in standard sizes that can be readily customized to fit varying size structures. The fire-resistant foam can be quickly installed over the tarp in depths of approximately 2 to 12 inches or more as desired if advantageous. When installed, this invention can prevent damage to a free-standing structure and its contents from external wildfire or firestorm. For a structural building, its contents, the preferred embodiment of the and Hurricane Asset Protection System is a hurricane protection system for protecting a free-standing structure that is a residential structure, a commercial structure, or a governmental structure from a hurricane and high velocity debris, the system can be fabricated and later removed after a hurricane ends, and is comprising of: (a) a cover with two surfaces, the cover is configured to fully encase an exterior of the free-standing structure with a water-resistant seal of the cover completed using a sealing tape; (b) at least one circumferential hold down strap placed vertically to the ground and externally to the polymer cover and at least one hold down strap placed horizontally to the ground, placed encircling the free-standing structure, and placed externally to the cover; (c) a series of anchors placed into the ground and one of the anchors attached to each end of the at least one hold down strap placed vertically; (d) a wind and debris resistant spray foam layered between 1.9 inches and 12.1 inches in thickness, the spray foam fully encasing the cover, the at least one hold down strap, the anchors, the corner bands, and the seal tape; and (e) a prodding/push pole to tuck the hurricane spray foam and the cover into a window, a door frame, a soffit, and an underhangs of the free-standing structure wherein the system can be individually installed into a position to completely isolate the free-standing structure from an external fire; wherein the cover can be manufactured in sizes that can be customized to fit the free-standing structures; and wherein when installed, the system can mitigate and prevent hurricane and high velocity debris damage to the free-standing structure and its contents. Optional adds include corner bands, strengthening mesh for the cover, and a release flap/valve to equalize inside and outside pressure of a building structure during a hurricane.

Objects and Advantages

There are several objects and advantages of the Special Fire Protection System for Runaway Grass and Forest Fires and Method for Use and Hurricane Asset Protection System. There is currently no known fire protective or hurricane resisting/protection, fast deploying structural buildings and high cost/value systems that are effective at providing the objects of this invention.

The Special Fire Protection System for Runaway Grass and Forest Fires and Method for Use and Hurricane Asset Protection System have various advantages and benefits:

| Item | Advantages |
|---|---|
| 1 | Is fast to deploy onto structures and high cost/ value objects; |
| 2 | Requires no water; |
| 3 | Can be used for residential, commercial, and governmental structures - cover a wide variety of building structures; |
| 4 | Can be deployed in hot or wet environment; |
| 5 | Requires no pre-measurements; |
| 6 | Requires only simple training for installation and use; |
| 7 | Can pre deploy materials, if needed, in likely fire danger zones for a short time reactions to wildfires; |
| 8 | Can favorably impact insurance premiums; |
| 9 | Permits pre-planning and having materials staged near or at likely danger zones; |
| 10 | Provides a means for protecting valuable property and/or lives from approaching fires, notably rapidly moving forest, and brush fires, commonly referred to as “firestorms”; |
| 11 | Provides a means to rapidly cover a man-made structure with a fire-resistant/Hurricane resistant system while maintaining a separate lining or an air space between the protected structure and the fire-resistant structure. |

-continued

| Item | Advantages |
| --- | --- |
| 12 | Provides protection system for buildings from hurricane storms as well as high velocity debris of such storms |
| 13 | Provides protection system for high cost/ high value objects from hurricane storms as well as high velocity debris of such storms |
| 14 | Provides system to track with Global Positioning System (GPS) trackers lost or dislocated high cost/ high value objects as a result of hurricane storms |
| 15 | Can be used to protect cell towers during hurricanes |

Finally, other advantages and additional features of the present Special Fire Protection System for Runaway Grass and Forest Fires and Method for Use and the Hurricane Asset Protection System 35 for preparing real estate, vehicles, and other high cost/value objects and tangible property for natural and manmade calamities and their aftermath will be more apparent from the accompanying drawings and from the full description of the device. For one skilled in the art of fire protection systems for structures, it is readily understood that the features shown in the examples with this product are readily adapted to other types of fire and structural protection systems and methods.

DESCRIPTION OF THE DRAWINGS—FIGURES

The accompanying drawings, which are incorporated in and constitute a part of this specification, illustrate an embodiment of the Special Fire Protection System for Runaway Grass and Forest Fires and Method for Use and Hurricane Asset Protection System for preparing real estate, vehicles, and other high cost/value objects and tangible property for natural and manmade calamities and their aftermath that are preferred. The drawings together with the summary description given above and a detailed description given below serve to explain the principles of the fire and hurricane protection systems and methods. It is understood, however, that the Special Fire Protection System for Runaway Grass and Forest Fires and Method for Use as well as the Hurricane protection system is not limited to only the precise arrangements and instrumentalities shown.

FIGS. 1A through 1D are sketches of the special protection method and system for protecting structures from hurricanes and runaway grass and forest fires.

FIG. 8 is a listing of the process to deploy protection system onto structures for protection from runaway grass and forest fires.

FIGS. 13A through 13F are sketches of the hurricane protection system for building structures with the components and features shown.

FIGS. 14A through 14C are sketches of the hurricane protection system for high cost and value assets with the components and features shown.

FIGS. 15A and 15B are listings of the process to deploy protection system onto structures and high cost/value items for protection from hurricanes and high velocity debris calamities with steps and options described.

DESCRIPTION OF THE DRAWINGS—REFERENCE NUMERALS

Figure 2B:
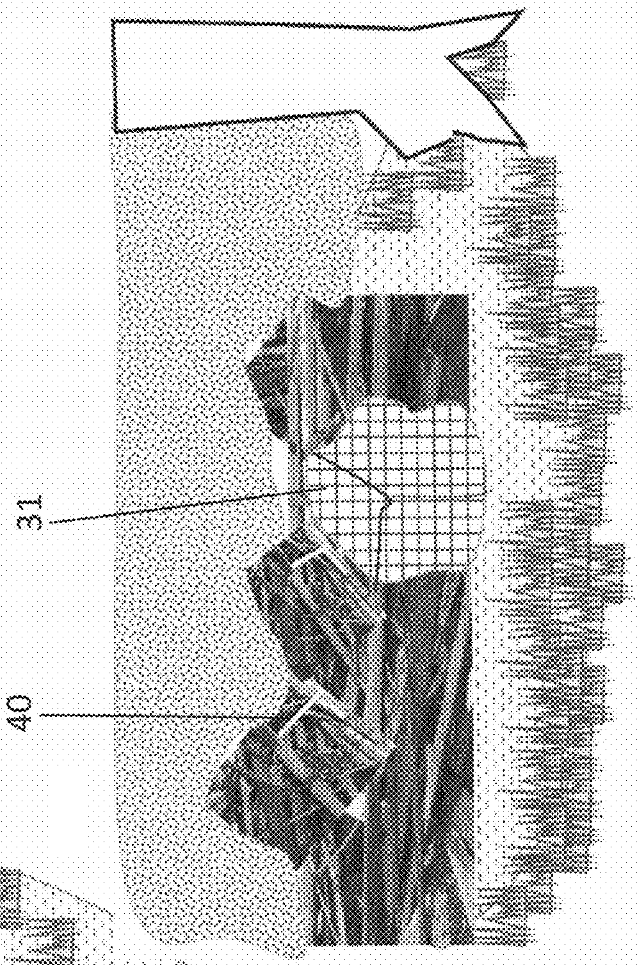
FIGS. 2A and 2B are sketches of the general prototype structure coating and fire source for initial testing of the protection system.

The following list refers to the drawings:

TABLE B

| Reference numbers | |
| --- | --- |
| Ref # | Description |
| 30 | Fire protection system 30 for protecting structures from runaway grass and forest fires |
| 31 | Prototype 31 of fire protection system 30 |
| 33 | Initial system design 33 for fire protection system 30 |
| 35 | Hurricane protection system 35 for protecting structures from High Winds and hurricane like storms |
| 40 | Fire source 40 for testing prototype 31 |
| 45 | Resultant fire 45 for testing prototype 31 |
| 48 | Temperature read out 48 inside prototype 31 during test |
| 50 | Residential house structure 50 |
| 51 | Commercial building 51 strip mall, etc. |
| 52 | Modern residential 52 |
| 54 | Corner bands 54 (optional) |
| 55 | Pre spray release coating 55 |
| 56 | Heat reflective cover 56 tarp, roll / out matting, fold out matting with reflective surface on one or both sides |
| 56A | a polymer cover 56A tarp, roll/ out matting, fold out matting, or water-resistant canvas with two surfaces and can have incorporate optional strengthening mesh 66 |
| 57 | Fireproof spray foam 57 - approximately 2 to 12 inches, with fire retardant additive, normally closed cell and 800 to 1400 degrees Celsius minimum resistivity; 2 pound (lb.) per cubic foot, closed cell urethane-based polymer foam at full cu ft weighs 2 lb. per cubic foot, not de-gassing; closed cell urethane-based polymer thickness 1.9 inches to 12.1 inches preferred |
| 57A | Hurricane spray foam 57A - approximately 2 to 12 inches, with optional fire-retardant additive, normally closed cell and 800 to 1400 degrees Celsius minimum resistivity; 2 pound (lb.) per cubic foot, closed cell urethane-based polymer foam at full cu ft weighs 2 lb. per cubic foot, not de-gassing; closed cell urethane-based polymer thickness 1.9 inches to 12.1 inches preferred; |
| 58 | Circumferential hold down straps 58, ropes, cable, etc. |
| 59 | Anchors 59 - straight legged, augers, angle legged, etc. |
| 59A | Prodding/ push pole 59A to tuck sprayed tarp into windows, door frames, soffits and under hangs |
| 60 | Method 60 to protect structures from runaway grassed forest fires |

TABLE B-continued

| Reference numbers | |
|---|---|
| Ref # | Description |
| 61 | optional release flap/ valve/ section 61 loose flap section that permits some installations in high pressure conditions to equalize inside and outside pressure to prevent exploding and/ or imploding when inside and outside pressures vary greatly such as a loose flap attached at one edge to the cover 56 being approximately 1 foot square and attached at one edge of the flap 61 to the tarp 56; such as a simple one directional, one way check valve as a PVC part on a 4 to 8 inch diameter sized PVC port for pressure equalization |
| 62 | Method 62 to protect building structures 50, 51, 52 from high wind conditions and accompanying high speed debris |
| 64 | Method 64 to protect high cost/ value objects 69 from high wind conditions and accompanying high speed debris |
| 66 | optional strengthening mesh 66 for high wind and hurricane resistance from high winds, by deflecting high impact flying debris - separate or incorporated as strengthening to cover 56A |
| 67 | pressure sprayer 67 to clean foam 57 |
| 68 | optional global positioning system (GPS) transmitter 68 for tracking and finding encased objects 69 protected by the Hurricane protection system 35 |
| 69 | objects 69 for protection |
| 69A | statues 69A |
| 69B | modern art 69B |
| 69C | cellular telephone towers and fixed electronics 69C |
| 69D | classic and collectible cars/ trucks 69D |
| 69E | race vehicles - cars, trucks, go-karts, motorcycles etc. 69E |
| 69F | vehicles - cars, trucks, daily use vehicles 69E |
| 69G | boats - pontoons, houseboats, speedboats, sailboats, etc. 69G |
| 69H | Recreation vehicles and trailers 69H |
| 101 | Prior art 101 Patent No 5, 423, 150 drop cloth |
| 102 | Prior art 102 Patent No 4, 858, 394 cover and zip cloth |
| 103 | Prior art 103 Patent No 5, 608, 992 tent pole cover |
| 104 | Prior art 104 Patent No 5, 860,251 water filled |
| 105 | Prior art 105 Publication No 2005/0170725 cable down |
| 106 | Prior art 106 Patent No 3, 715, 843 tarp strap cover |
| 107 | Prior art 107 Patent No 7, 395, 869 magnet cover |
| 108 | Prior art 108 Patent No 9, 381, 387 water cascade |
| 109 | Prior art 109 Publication No 2009/0269449 hut cover |
| 110 | Prior art 110 Publication No 2012/0227990 metro slide |

DETAILED DESCRIPTION OF PREFERRED EMBODIMENT

This invention relates to a Special Fire Protection System for Runaway Grass and Forest Fires and Method for Use and to a Hurricane Asset Protection System for preparing real estate, vehicles, and other tangible property from natural and manmade calamities and their aftermath. Simply stated it is related to high wind/hurricane storms and fire protection systems for real estate structures, expensive and difficult property objects to move when a calamity and storm arises, property like vehicles (cars, trucks, trailers, boats and jet ski units, recreational vehicles, motorcycles, statues, and the like). The embodiments herein are particularly related to hurricane, flood, and fire protection devices and accessories used for protecting building structures as well as expensive, difficult objects/personal property with short notice to the owners. The embodiments herein are more particularly related to protection sheets and insulating blankets with foam used for protecting the example assets. The protection is accomplished without direct modification and physical attachments to the assets-either the building structure or other personal property that is difficult to move. More particularly, the present invention relates to a system for a hurricane resistant covering that can be quickly deployed over buildings and other property objects when confronted with an approaching natural or manmade disaster. This can permit insurance companies and others to protect the loss of the asset and remove the wrap after the hurricane or calamity has passed. Furthermore, the present disclosure relates to a system and method of use for a system that protect real estate and other tangible property objects from damage or combustion when exposed to hurricanes or to a natural or manmade disaster like extremely high wind, uncontrolled floods, fires, rain, sleet, ice, and snow. It also can discourage looting and theft of property during the aftermath of a natural or manmade disaster. This is a design of a system for emergency deployment in the event of approaching hazardous conditions, especially rapidly moving disasters with short notice. The present invention relates generally to an asset protection isolation and covering system for free standing real estate structures and buildings, as well as vehicles which are difficult to prepare and move with short notice. More particularly, the present invention relates to a system for a storm-resistant building cover which can be employed as well for other structures, residential and commercial.

The advantages for the Special Fire Protection System 30 for Runaway Grass and Forest Fires and Method for Use and the Hurricane Asset Protection System 35 are listed above in the introduction. Succinctly the benefits are that the device:

A. Is fast to deploy onto structures and high cost/value objects;
B. Requires no water;
C. Can be used for residential, commercial, and governmental structures-cover a wide variety of building structures;
D. Can be deployed in hot or wet environment;
E. Requires no pre-measurements;
F. Requires only simple training for installation and use;
G. Can pre deploy materials, if needed, in likely fire danger zones for a short time reactions to wildfires;
H. Can favorably impact insurance premiums;
I. Permits pre-planning and having materials staged near or at likely danger zones;
J. Provides a means for protecting valuable property and/or lives from approaching fires, notably rapidly-moving forest and brush fires, commonly referred to as "fire-storms";
K. Provides a means to rapidly cover a man-made structure with a fire-resistant structure fire-resistant/Hurricane resistant system while maintaining a separate lining or an air space between the protected structure and the fire-resistant structure;
L. Provides protection system for buildings from hurricane storms as well as high velocity debris of such storms;
M. Provides protection system for high cost/high value objects from hurricane storms as well as high velocity debris of such storms;
N. Provides system to track with Global Positioning System (GPS) trackers lost or dislocated high cost/high value objects as a result of hurricane storms; and
O. Can be used to protect cell towers during hurricanes The preferred embodiment of the Special Fire Protection System 30 is a fire protection system 30 for protecting residential, commercial and governmental structures from runaway grass and forest fires comprised of: (a) a heat reflective cover 56 tarp, roll-out matting, or fold out matting with reflective surface on one or both sides, the tarp is configured to fully encase the structure; (b) a fire proof spray foam 57—approximately 2 to 12 inches, with fire retardant additive, normally closed cell and 800 to 1400 degrees Celsius minimum resistivity, the foam is applied to fully encase the tarp; (c) multiple hold down straps 58, ropes, cable, etc.; (d) a Prodding/push pole 59A to tuck sprayed tarp into windows, door frames, soffits and under hangs; (e) a series of anchors 59—straight, augers, etc.; (f) a pre spray release coating 55 (optional); and (g) a set of corner bands 54 (optional) wherein the system, broadly considered, can be individually installed into a position to completely isolate a free-standing structure from an external fire. The heat reflective tarp may be manufactured in standard sizes that can be readily customized to fit varying size structures. The fire-resistant foam can be quickly installed over the tarp in depths of approximately 2 to 12 inches or more as desired if advantageous. When installed, this invention can prevent damage to a free-standing structure and its contents from external wildfire or firestorm. The preferred embodiment of the and Hurricane Asset Protection System 35 is a hurricane protection system 35 for protecting a free-standing structure that is a residential structure, a commercial structure, or a governmental structure from a hurricane and high velocity debris, the system can be fabricated and later removed after a hurricane ends, and is comprising of: (a) a cover 56A with two surfaces, the cover is configured to fully encase an exterior of the free-standing structure with a water-resistant seal of the cover 56A completed using a sealing tape 54A; (b) at least one circumferential hold down strap 58 placed vertically to the ground and externally to the polymer cover 56A and at least one hold down strap placed horizontally to the ground, placed encircling the free-standing structure, and placed externally to the cover 56A; (c) a series of anchors 59 placed into the ground and one of the anchors attached to each end of the at least one hold down strap 58 placed vertically; (d) a wind and debris resistant spray foam 57A layered between 1.9 inches and 12.1 inches in thickness, the spray foam 57A fully encasing the cover 56A, the at least one hold down strap, the anchors, the corner bands 54, and the seal tape 54A; and (e) a prodding/push pole 59A to tuck the hurricane spray foam 57A and the cover 56A into a window, a door frame, a soffit, and an under-hangs of the free-standing structure wherein the system 35 can be individually installed into a position to completely isolate the free-standing structure from an external fire; wherein the cover can be manufactured in sizes that can be customized to fit the free-standing structures; and wherein when installed, the system 35 can mitigate and prevent hurricane and high velocity debris damage to the free-standing structure and its contents. Optional adds include corner bands, strengthening mesh for the cover, and a release flap/valve to equalize inside and outside pressure of a building structure during a hurricane.

There is shown in FIGS. 1-15 a complete description and operative embodiment of the Special Fire Protection System 30 for Runaway Grass and Forest Fires and Method for Use and Hurricane Asset Protection System 35 for preparing real estate, vehicles, and other tangible property for natural and manmade calamities and their aftermath. In the drawings and illustrations, one notes well that FIGS. 1-15 demonstrate the general configuration and use of these systems and processes. The various example uses are in the operation and use section, below.

The accompanying drawings, which are incorporated in and constitute a part of this specification, illustrate a preferred embodiments of the Special Fire Protection System 30 for Runaway Grass and Forest Fires and Hurricane Asset Protection System 35. The drawings together with the summary description given above and a detailed description given below serve to explain the principles of the Special System 30 and the method is described in the section below. It is understood, however, that the special systems 30, 31 are not limited to only the precise arrangements and instrumentalities shown. Other examples of fire and hurricane protection systems and uses are still understood by one skilled in the art of fire and storm protection systems to be within the scope and spirit shown here.

FIGS. 1A through 1D are sketches of the special protection method and system 30 for protecting structures from runaway grass and forest fires and Hurricane protection systems 35 for protecting structures from High Winds and hurricane like storms. Shown here are a set of sketches summarizing the invention presented here. Included are: a fire protection system 30 for protecting structures from runaway grass and forest fires; a prototype 31 of fire protection system 30; a Hurricane protection system 35 for protecting structures from High Winds and hurricane like storms; and the method 62 to protect structures from hurricanes and high velocity debris.

Figure 2A:
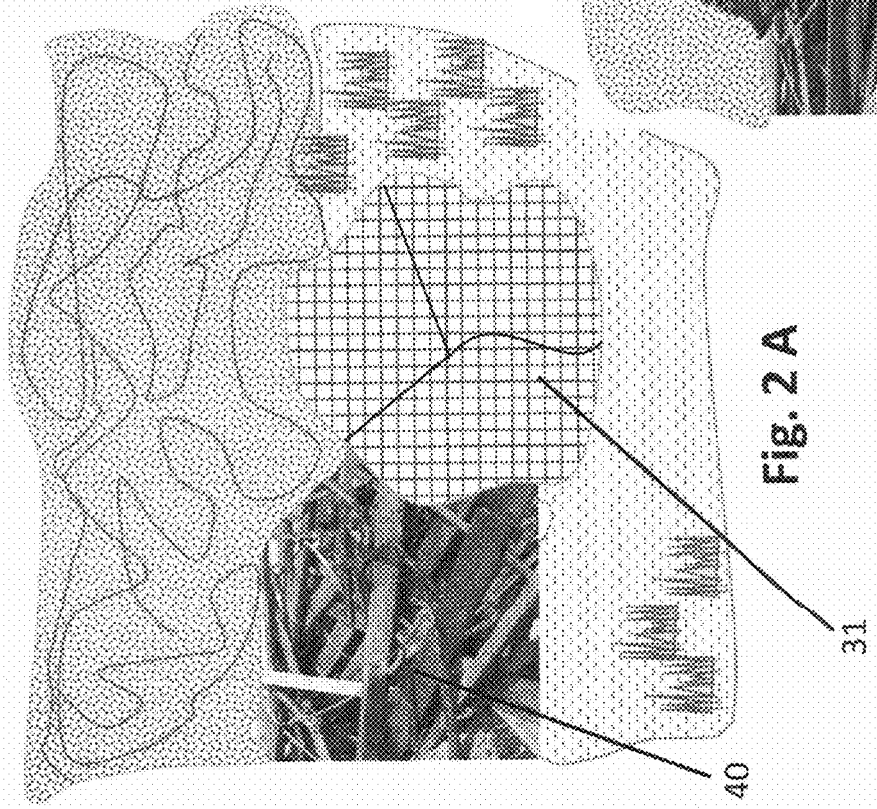

FIGS. 2A and 2B are sketches of the general prototype structure 31 coating and fire source 40 for initial testing of the protection system. This is in preparation for the test to demonstrate the effectiveness of the heat reflective tarp coupled with the foam with fire retardant additive place approximately 2 to 12 inches thick over the entire structure.

Figure 3A:
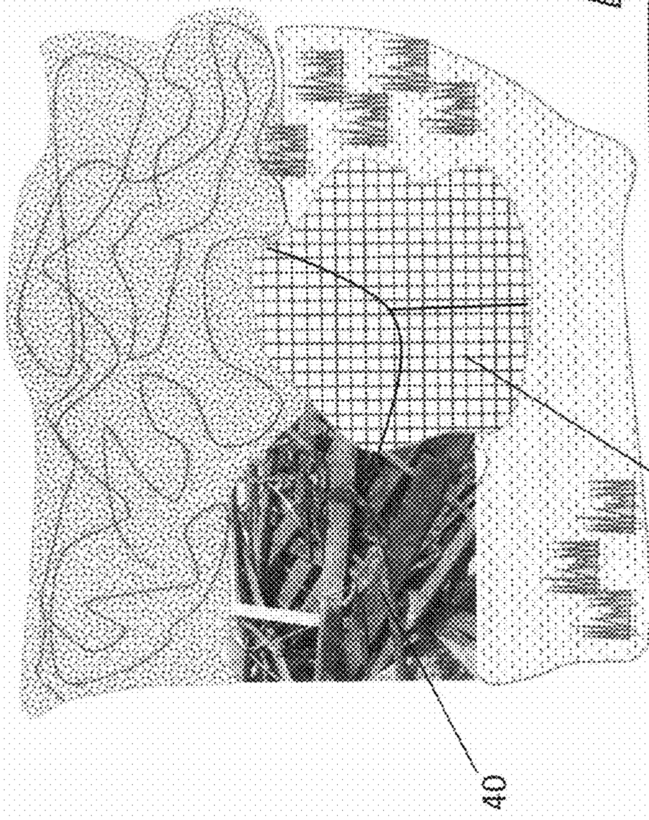
FIGS. 3A through 3C are sketches of the fire testing of prototype protection system with the components and features shown.
Figure 3B:
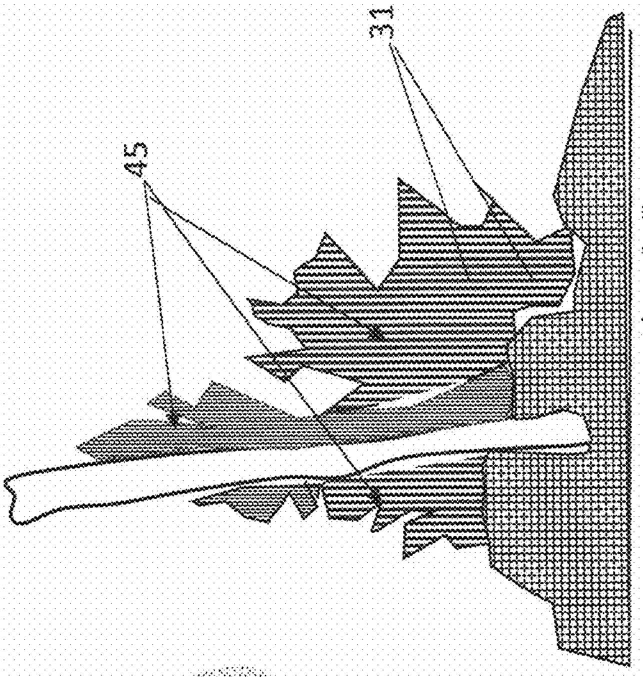
Figure 3C:
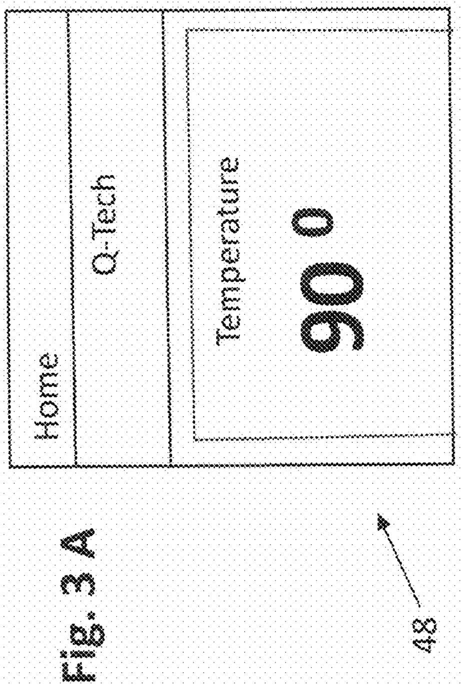

FIGS. 3A through 3C are sketches of the fire testing of prototype 31 protection system with the components and features shown. In these views are seen: a prototype 31 of fire protection system 30; a fire source 40 for testing prototype 31; the resultant fire 45 for testing prototype 31; and a temperature read out 48 inside prototype 31 during test. The test results show an internal test temperature of 90 degrees Fahrenheit (F) when exposed to the raging inferno outside the structure protected by the protective a fire protection system 30 for protecting structures from runaway grass and forest fires. This was a successful test for the fire system and proved a good method to install the tarp and foam onto the structures. Commonly known temperatures certainly known or easily conformed by a person skilled in the art (POSA) of heat, fire, and combustion (prevention) devices and processes: A person can continue to touch a surface until it reaches 140 degrees F. (60 C). Wax (paraffin) melts at 115 to 140 degrees F. (60 C). Water boils at 212 Deg F-100 deg C. Paper combusts at 480 deg F-248/250 C. In the FIG. 3C shows a temperature read out of 90 degrees for the test. This is F as well but even at 90 C, only some candles and minimal damage would occur to the protected structure.

Figures 4A, 4B:
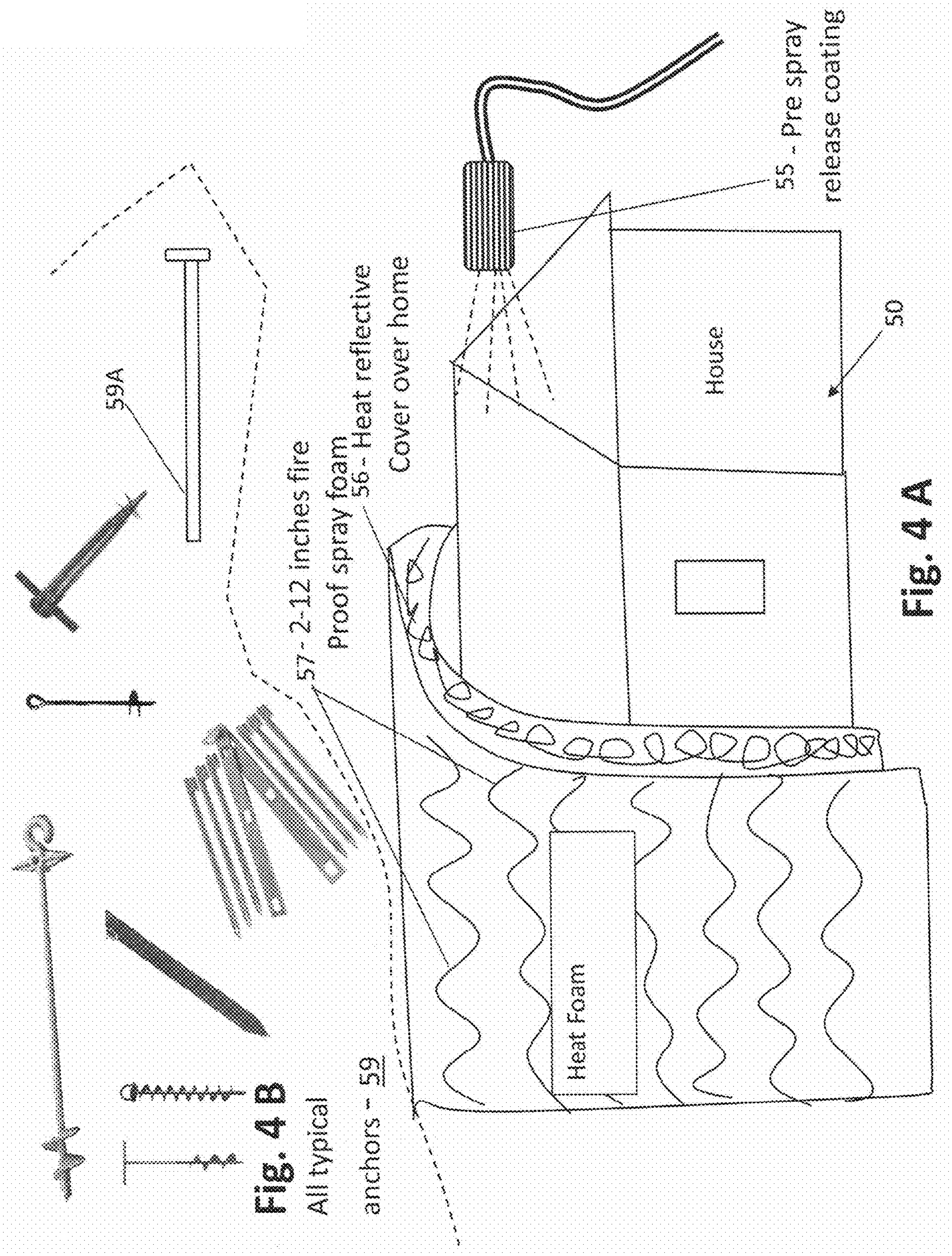
FIG. 4A is a sketch of the initial design sketch for the protection system for structures in runaway grass and food forest fires and FIG. 4B are typical ground anchors.
Figure 5B:
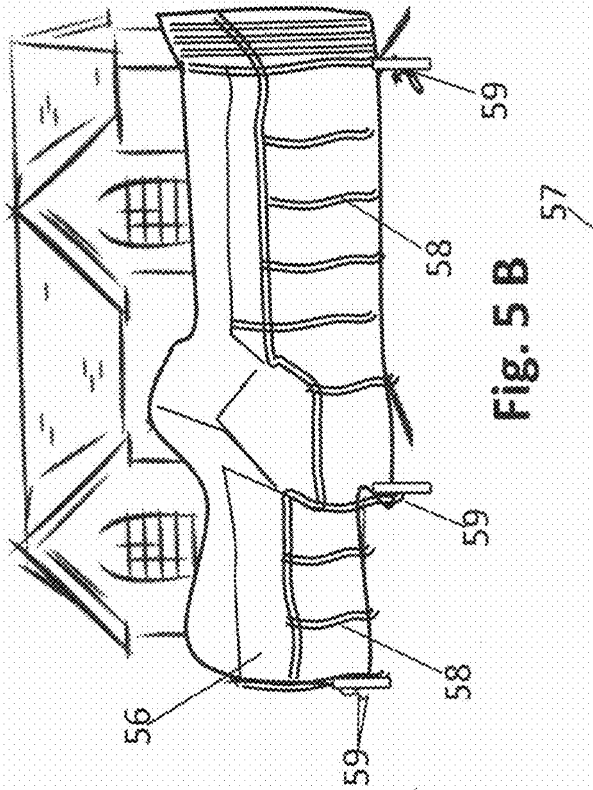
FIGS. 5A through 5D are sketches of the protection system with a two-story residential structure.
Figure 5A:
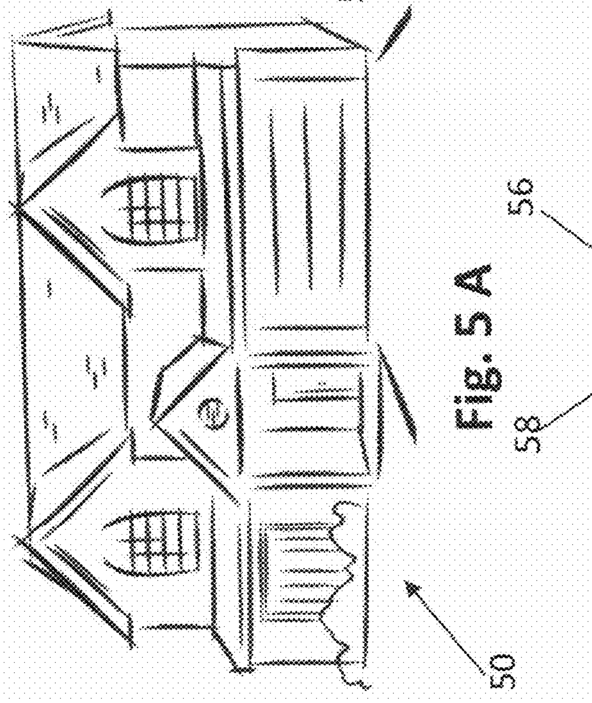
Figure 5D:
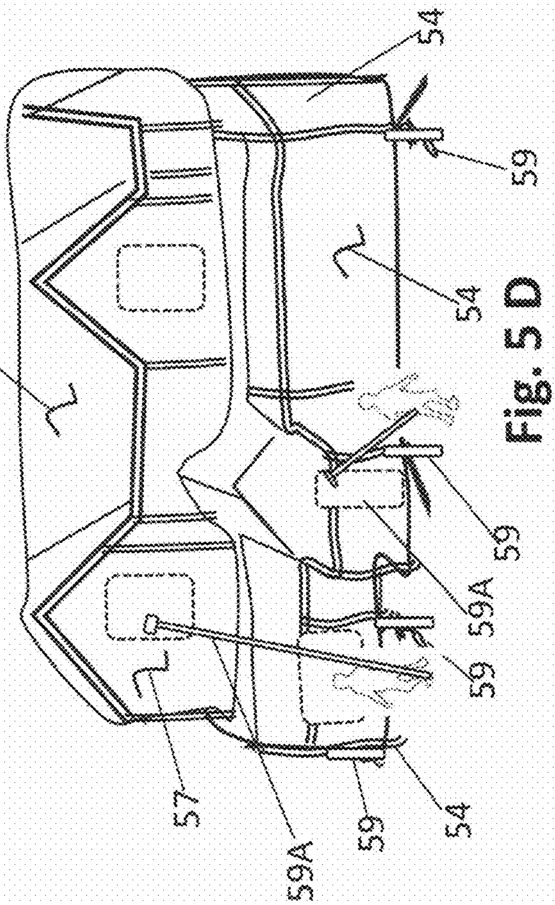
Figure 5C:
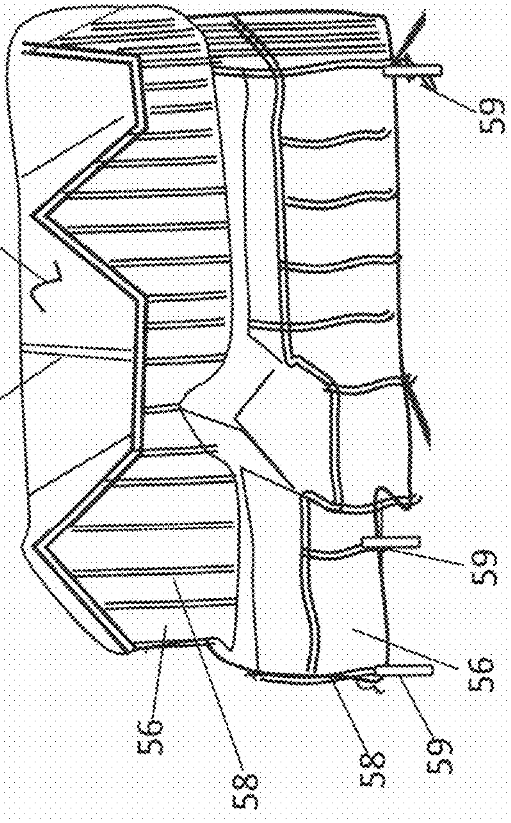
Figures 6A, 6B, 6C, 6D:
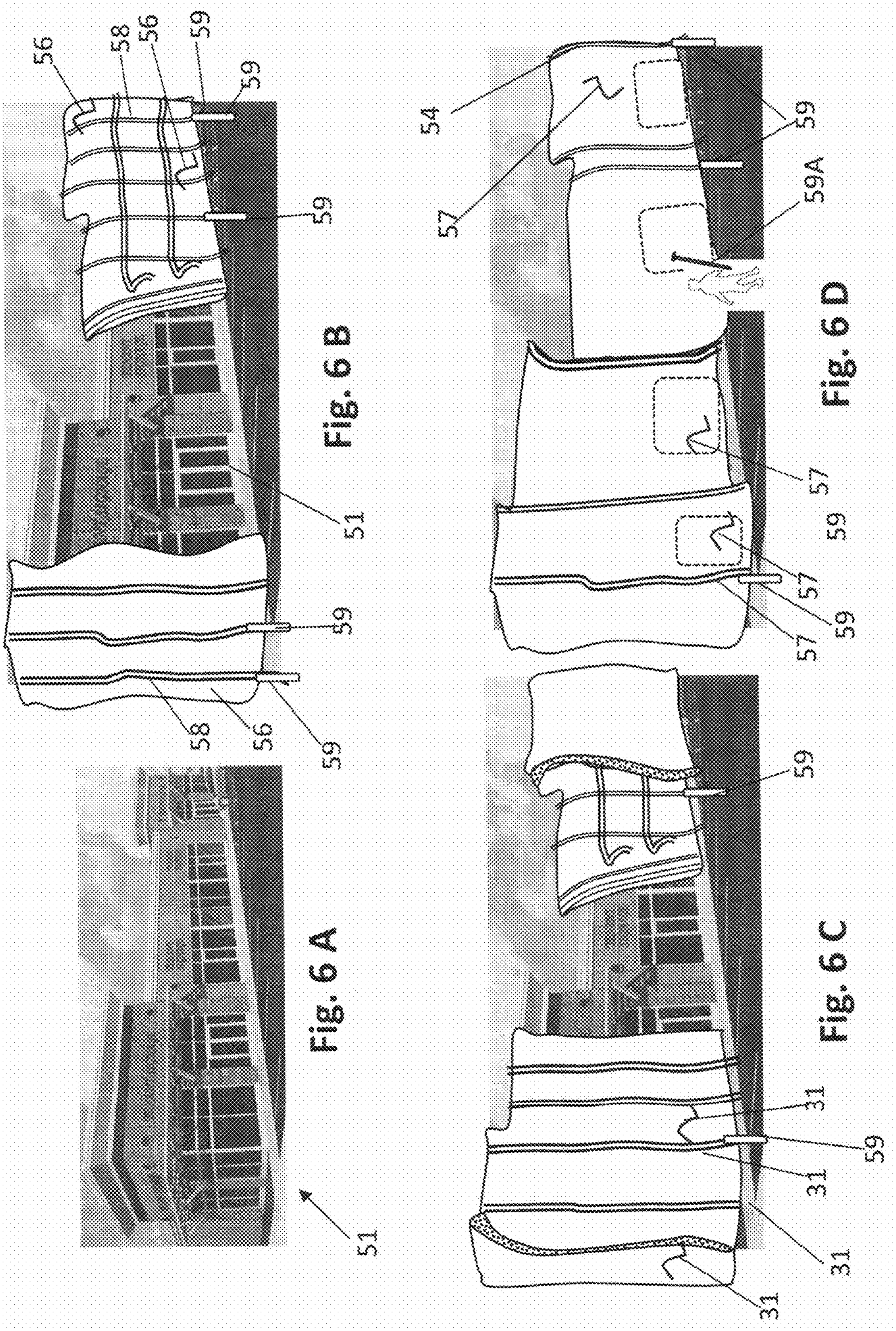
FIGS. 6A through 6D are sketches of the protection system for a small strip mall structure.
Figures 7A, 7B, 7C, 7D, 7E:
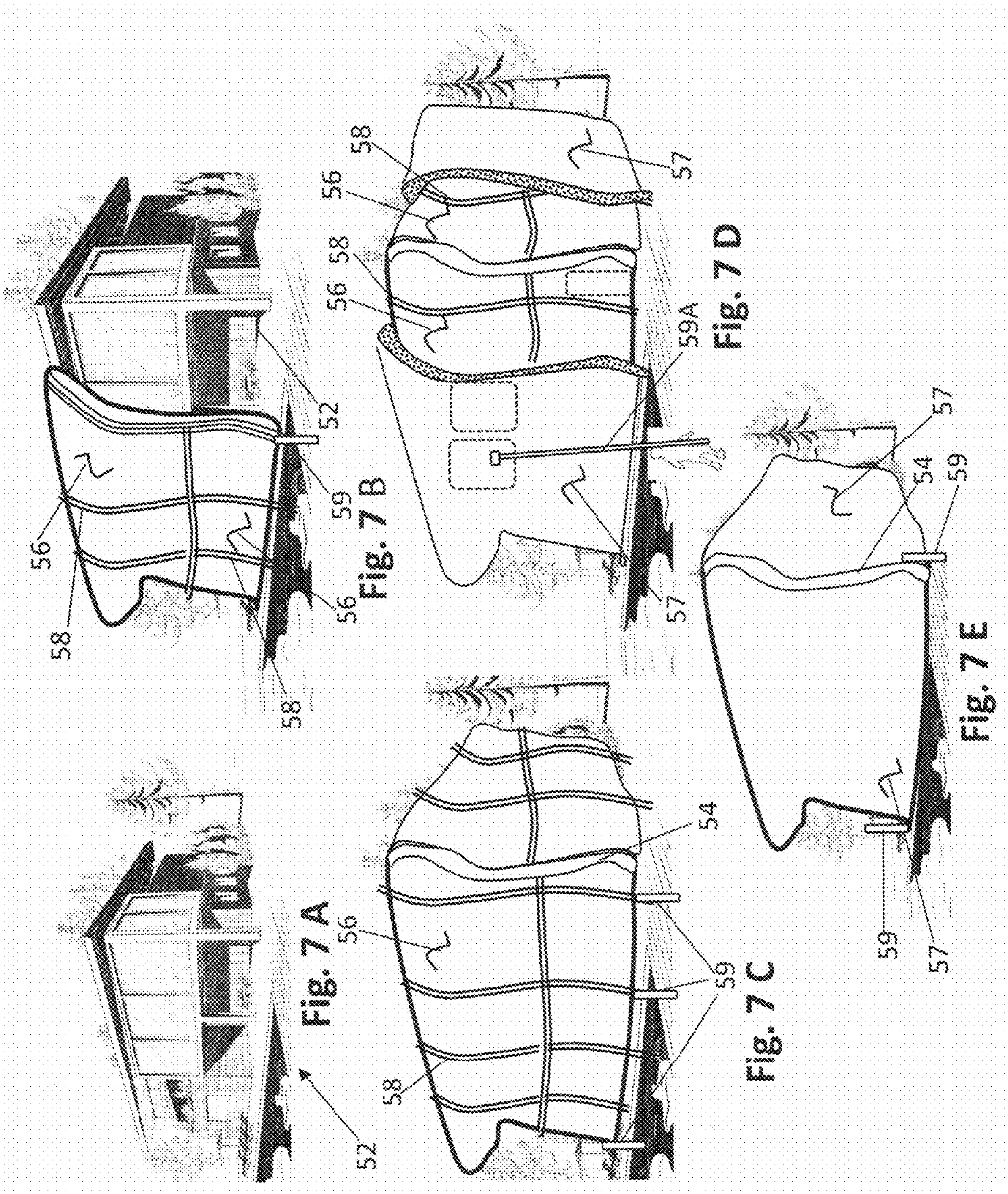
FIGS. 7A through 7E are sketches of the protection system for a modern west coast structure.

FIG. 4A is a sketch of the initial design sketch 33 for the protection system for structures in runaway grass and food forest fires and FIG. 4B are typical ground anchors 59. Here are shown: the initial system design 33 for fire protection system 30 and a series of various types of anchors 59—straight leg, augers, angled legged, etc. A pre-spray release coating 55 (optional) was added later if any (unforeseen and unexpected) problems are encountered with releasing the tarp from the structure.

FIGS. 5A through 5D are sketches of the protection system 30 with a two-story residential structure. In these views, the structure 50 is seen, then the tarps, straps, and anchors, and finally the foam. In a complete description is viewed: a fire protection system 30 for protecting structures from runaway grass and forest fires; a residential house structure 50; a set of corner bands 54 (optional); a pre spray release coating 55 (optional); a heat reflective cover 56 tarp, roll-out matting, fold-out matting with reflective surface on one or both sides; a fire proof spray foam 57—Fireproof/Hurricane spray foam 57—approximately 2 to 12 inches, with fire retardant additive, normally closed cell and 800 to 1400 degrees Celsius minimum resistivity; 2 pound (lb.) per cubic foot, closed cell urethane-based polymer foam at full cu ft weighs 2 lb. per cubic foot, not de-gassing; closed cell urethane-based polymer thickness 1.9 inches to 12.1 inches preferred; multiple hold down straps 58 straps, ropes, cable, etc.; prodding/push pole 59A to tuck sprayed tarp into windows, door frames, soffits and under hangs; and series of anchors 59—straight, augers, etc. Fire-proof spray foam is well known to persons that are skilled in the art (POSA) of fire-proofing structures in construction. The need to adhere to the heat resistive cover would not be difficult to overcome since many times these foams are used on Heating Ventilation and Air Conditioning Ducts which are galvanized/zinc plated. In fact, the original tests suggest a use of a release spray 55 due to the fire-proof foam sticking so well to the tarp (heat resistive cover). A simple Google search for fire-proof spray foams received a 13.9 million results. The inventors set the 2-to-12-inch range since materials are being developed rapidly and new composite materials may indeed change the more common high-density foams that are approximately 2 inches when applied to a more open cell, less density that can result in thicker applications. As stated above, fires pass quickly. Once a wildfire starts, it can advance at a velocity of about 6.8 mph in forests and up to 14 mph in grasslands. Simple math=To pass a 200-yard football field (fire and front) or 600 feet at 6 mph would take 600/6×5280 of an hour=0.189 hours [×60 min/hour]=1.13 minutes-so 15 minutes resistance is a safety factor of 10 and would be more than reasonable to a POSA.

FIGS. 6A through 6D are sketches of the protection system for a small strip mall structure 51. Here are viewed, similarly to the house structure 50, a fire protection system 30 for protecting structures from runaway grass and forest fires; a small strip mall structure 51; a set of corner bands 54 (optional); a pre spray release coating 55 (optional); a heat reflective cover 56 tarp, roll-out matting, fold-out matting with reflective surface on one or both sides; a fire proof spray foam 57—approximately 2 to 12 inches, with fire retardant additive, normally closed cell and 800 to 1400 degrees Celsius minimum resistivity; multiple hold down straps 58 straps, ropes, cable, etc.; prodding/push pole 59A to tuck sprayed tarp into windows, door frames, soffits and under hangs; and series of anchors 59—straight, augers, etc.

FIGS. 7A through 7E are other sketches of the protection system for a modern west coast structure 52. Again, these sketches show: a fire protection system 30 for protecting structures from runaway grass and forest fires; a modern west coast structure 52; a set of corner bands 54 (optional); a pre spray release coating 55 (optional); a heat reflective cover 56 tarp, roll-out matting, fold-out matting with reflective surface on one or both sides; a fire proof spray foam 57—approximately 2 to 12 inches, with fire retardant additive, normally closed cell and 800 to 1400 degrees Celsius minimum resistivity; multiple hold down straps 58 straps, ropes, cable, etc.; prodding/push pole 59A to tuck sprayed tarp into windows, door frames, soffits and under hangs; and series of anchors 59—straight, augers, etc.

When connecting the heat reflective cover 56 tarp, roll-out matting, foldout matting with reflective surface on one or both sides, the pieces can be rapidly fabricated by well-known methods, usually involving a combination of sewing, gluing, heat sealing, welding, taping or otherwise attaching a multiplicity of pre-cut shapes of the fire-resistant tarp/fabric 56 to form the desired shape upon deployment.

FIG. 8 is a listing of the method to process 60 and deploy the protection system 60 onto structures for protection from runaway grass and forest fires. This is described in the operation section below.

Figures 9A, 9B:
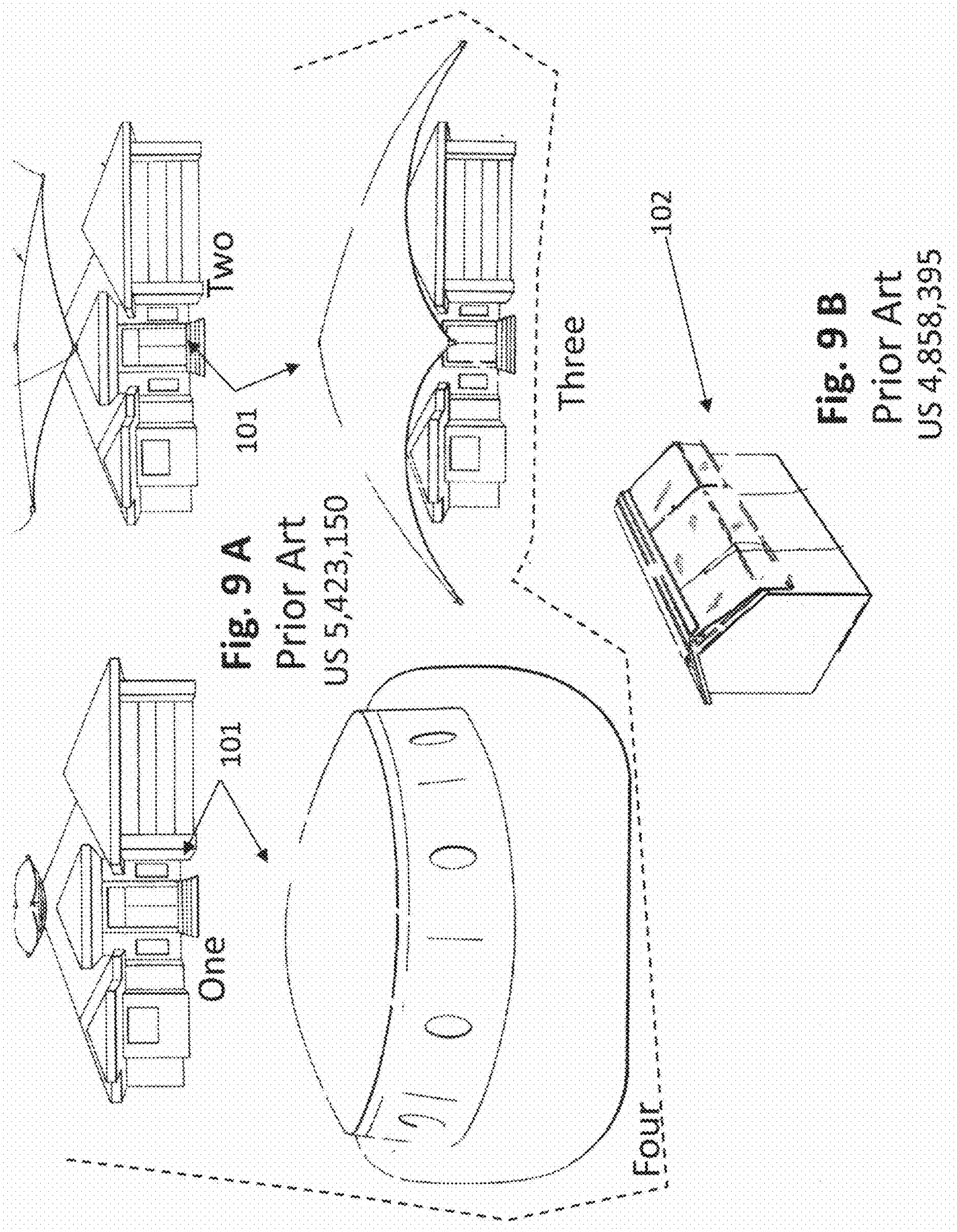
Fig. 9 A Prior Art
Fig. 9 B Prior Art
FIGS. 9A and 9B are sketches of prior art for fire protection systems.
Figures 10A, 10B, 10C:
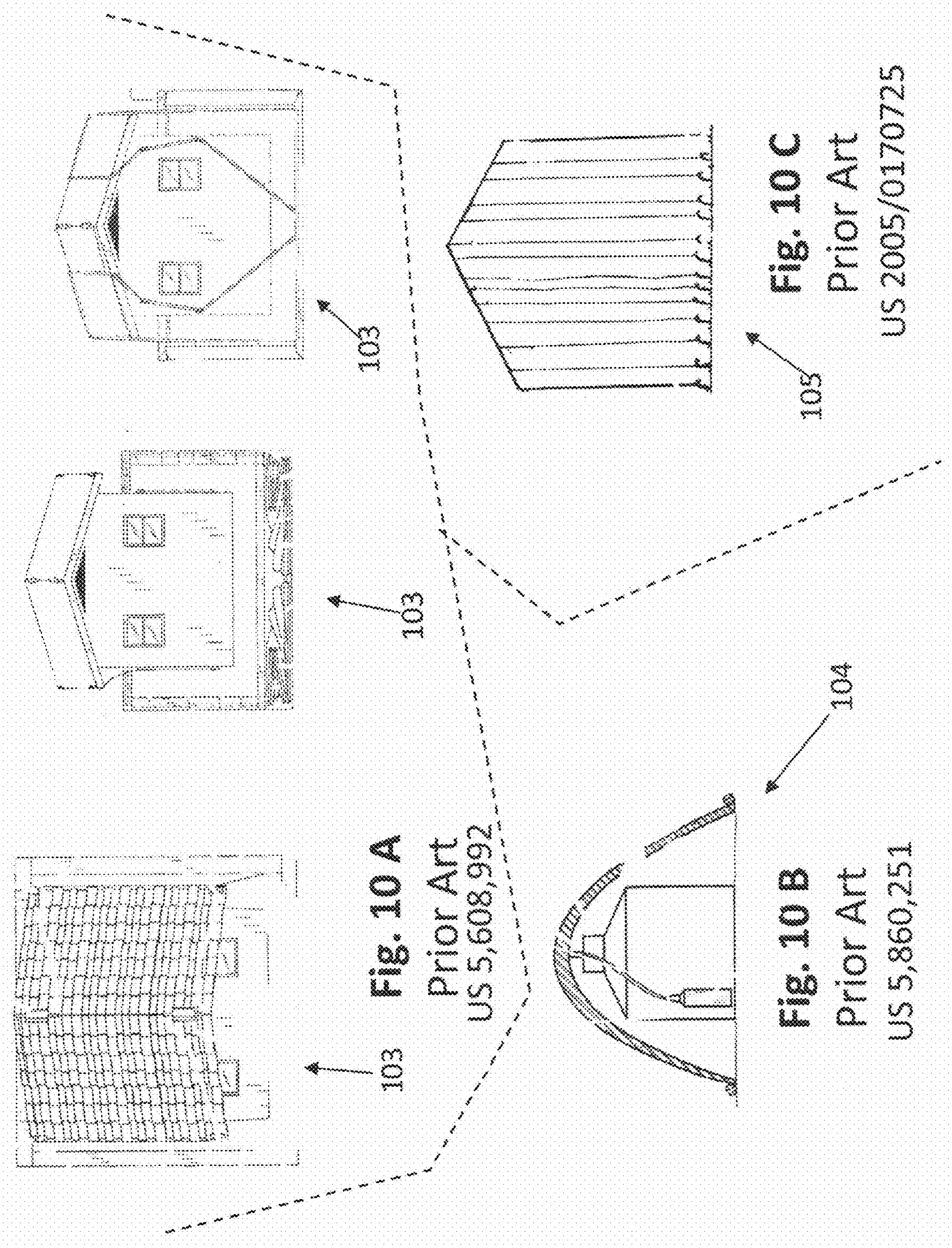
Fig. 10 A Prior Art
Fig. 10 B Prior Art
Fig. 10 C Prior Art
FIGS. 10A through 10C are more sketches of prior art fire protection systems.
Figures 11A, 11B, 11C:
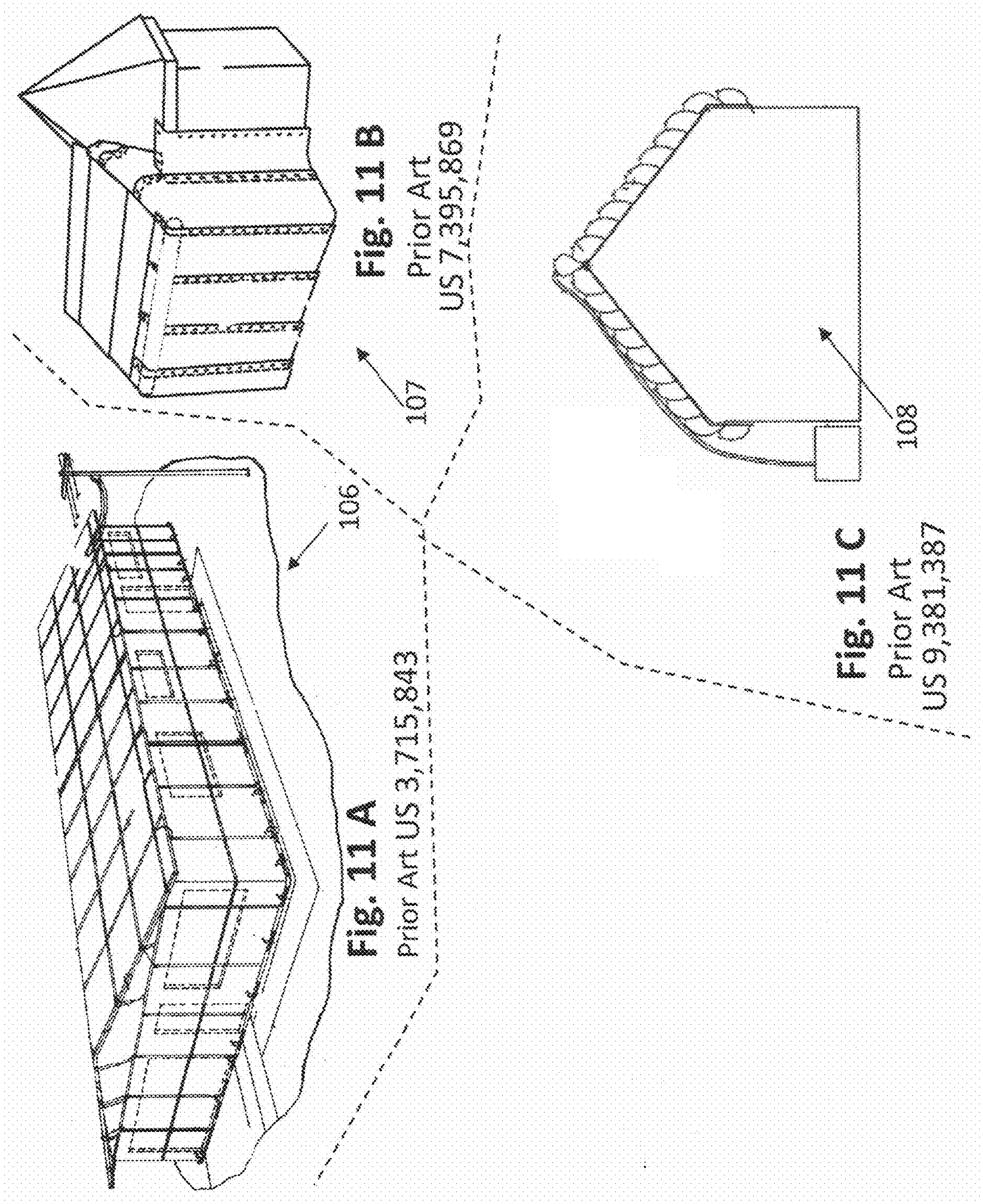
Fig. 11 B Prior Art
Fig. 11 C Prior Art
FIGS. 11A through 11C are even more sketches of prior art fire protection systems.
Figure 12A:
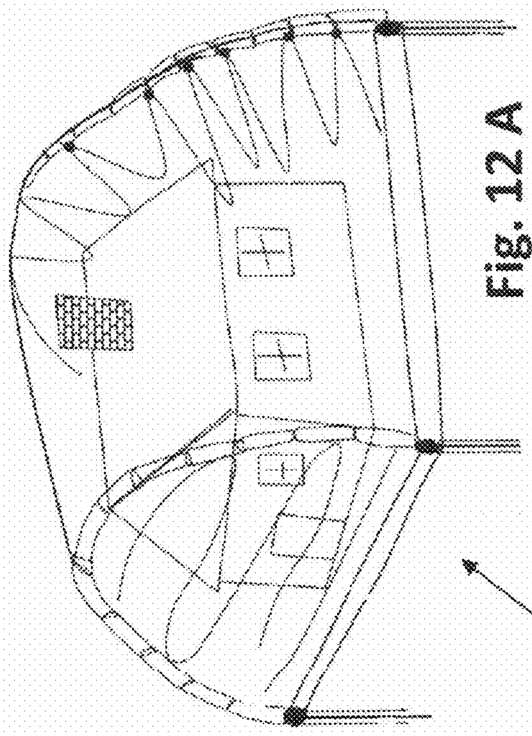
Fig. 12 A Prior Art
FIGS. 12A and 12B are more fire protection systems from prior art.
Figure 12B:
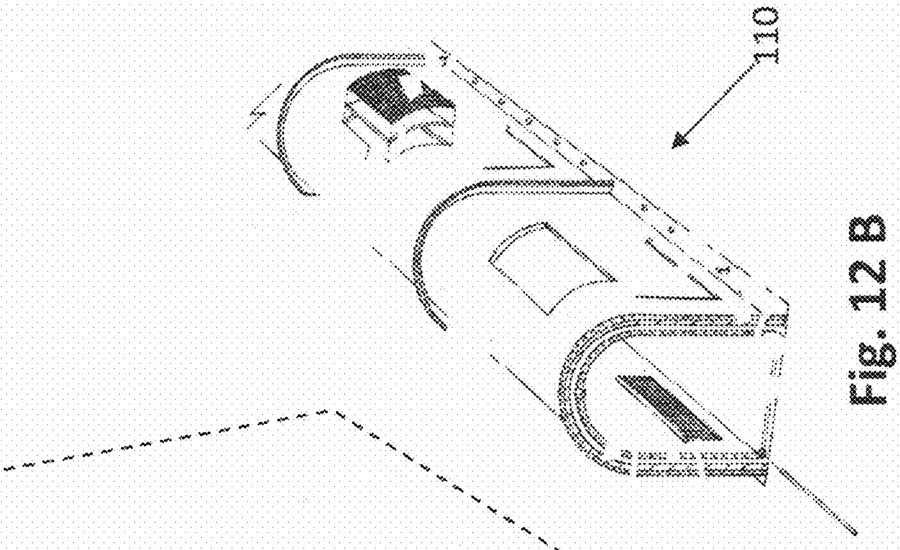
Fig. 12 B Prior Art
Figure 13A:
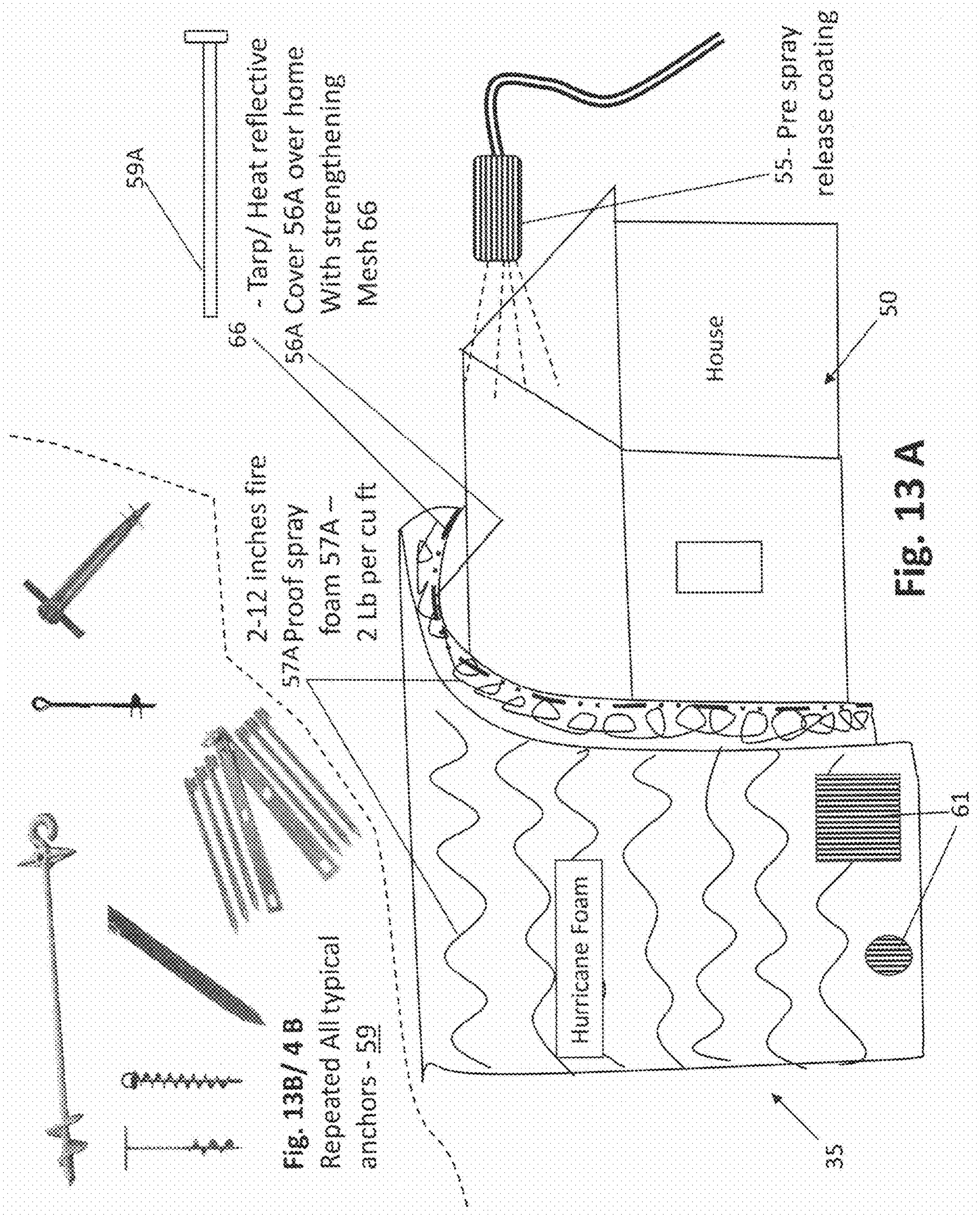
Figure 13D:
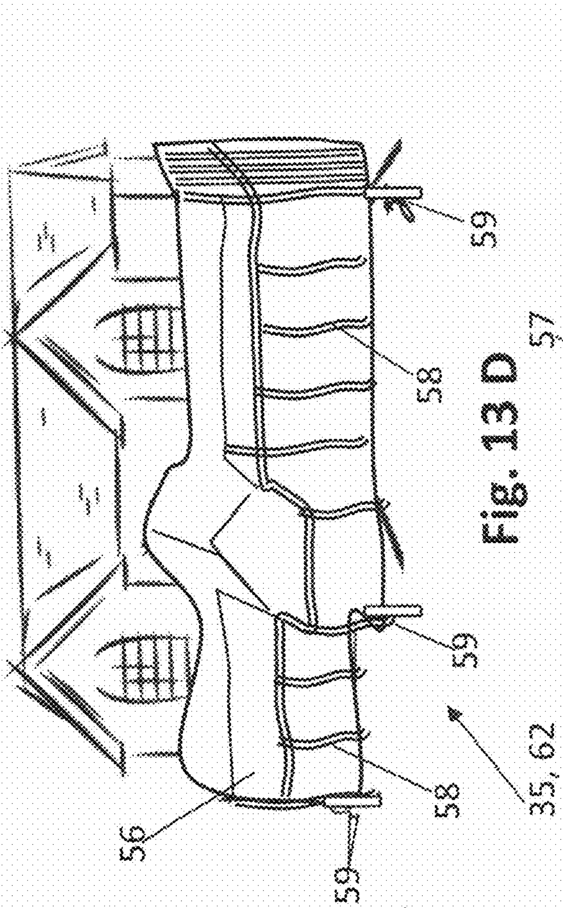
Figure 13C:
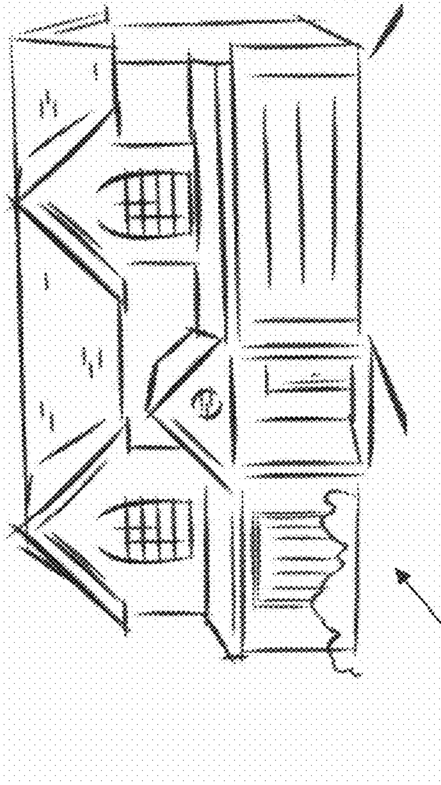
Figure 13F:
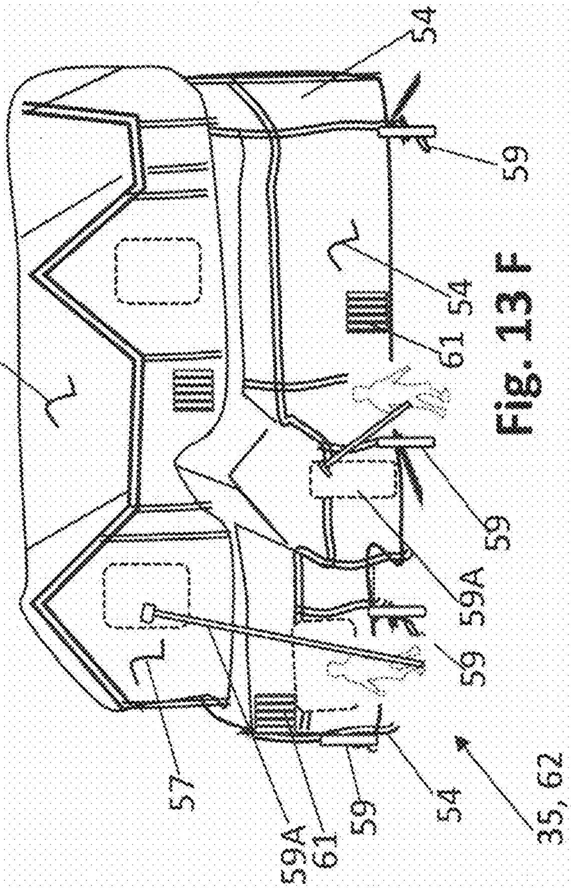
Figure 13E:
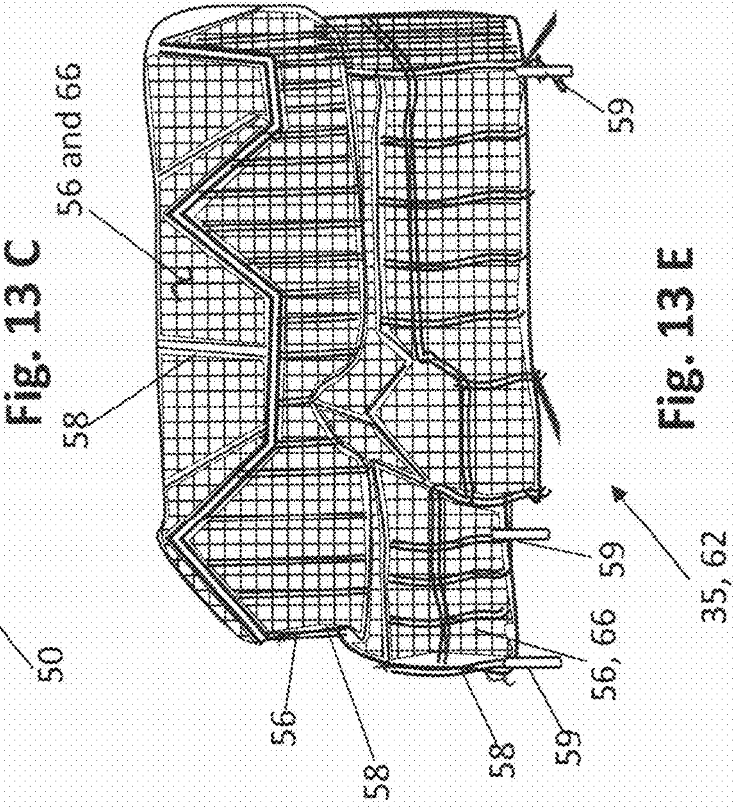

FIGS. 9A and 9B are sketches of prior art for fire protection systems. Here are former patents and applications of fire protection system, including: Prior art 101 U.S. Pat. No. 5,423,150—a large drop cloth covering and Prior art 102 U.S. Pat. No. 4,858,394—a cover and zip/closure device. FIGS. 10A through 10C are more sketches of prior art fire protection systems. Here former patents and applications of fire protection system, including: Prior art 103 U.S. Pat. No. 5,608,992—classic tent poles with a cover device; Prior art 104 U.S. Pat. No. 5,860,251—a water filled cover; and Prior art 105 Publication No 2005/0170725—a cover with a cable hold-down. FIGS. 11A through 11C are even more sketches of prior art fire protection systems. Here former patents and applications of fire protection system, including: Prior art 106 U.S. Pat. No. 3,715,843—a basic tarp and strap covering device; Prior art 107 U.S. Pat. No. 7,395,869—a cover with a magnetic holding means; and Prior art 108 U.S. Pat. No. 9,381,387—a water cascade covering structure. FIGS. 12A through 12B are more fire protection systems from prior art. Here former patents and applications of fire protection system, including: Prior art 109 Publication No 2009/0269449—a hut covering; Prior art 110 Publication No 2012/0227990—a metro slide covering FIGS. 13A through 13F are sketches of the hurricane protection system 35 for building structures with the components and features shown. Demonstrated here are: a Hurricane protection system 35 for protecting structures from High Winds and hurricane like storms; a residential house structure 50; a set of corner bands 54 and/or sealing tape 54A (like HVAC Duct® tape (optional); a pre-spray spray release coating 55; a polymer cover 56A tarp, roll/out matting, fold out matting, or water-resistant canvas with two surfaces and can have incorporate optional strengthening mesh 66; a Hurricane spray foam 57A—approximately 2 to 12 inches, with optional fire retardant additive, normally closed cell and 800 to 1400 degrees Celsius minimum resistivity; 2 pound (lb.) per cubic foot, closed cell urethane-based polymer foam at full cu ft weighs 2 lb. per cubic foot, not de-gassing; closed cell urethane-based polymer thickness 1.9 inches to 12.1 inches preferred; at least one circumferential hold down straps 58, ropes, cable, etc.; at least one anchors 59—straight legged, augers, angle legged, etc.; a prodding/push pole 59A to tuck sprayed tarp into windows, door frames, soffits and under hangs; an optional release flap/valve/section 61 loose flap section that permits some installations in high pressure conditions to equalize inside and outside pressure to prevent exploding and/or imploding when inside and outside pressures vary greatly such as a loose flap attached at one edge to the cover 56 being approximately 1 foot square and attached at one edge of the flap 61 to the tarp 56; such as a simple one directional, one way check valve as a PVC part on a 4 to 8 inch diameter sized PVC port for pressure equalization; an optional strengthening mesh 66 for high wind and hurricane resistance from high winds, by deflecting high impact flying debris-separate or incorporated as strengthening to cove 56A; a pressure sprayer 67 to clean foam 57, 57A; and an optional global positioning system (GPS) transmitter 68 for tracking and finding encased objects 69 protected by the Hurricane protection system 35. With all the structure options, it is anticipated that the covers 56A can have pre-installed grommets ready to place on pre-installed hooks. Thereby, the covers (with optional pressure flaps 61) can be quickly placed on the building structure and corners taped 54A, the foam 57A added, then the circumferential strap 58 installed and optional corner boards 54 and finally, the straps be secured to the anchors 59. This hurricane system 35 can be used with all types of buildings—a residential house structure 50, a commercial building 51 strip mall, etc., and a modern residential structure 52. Post disaster, the wrapped structures can help deter looters and better secure the structures before owners/lessees return and use of the structure can restart. Other structures that can be protected: bridges, traffic signals, towers, electronic control stations, emergency, government, and military structures.

Figure 14A:
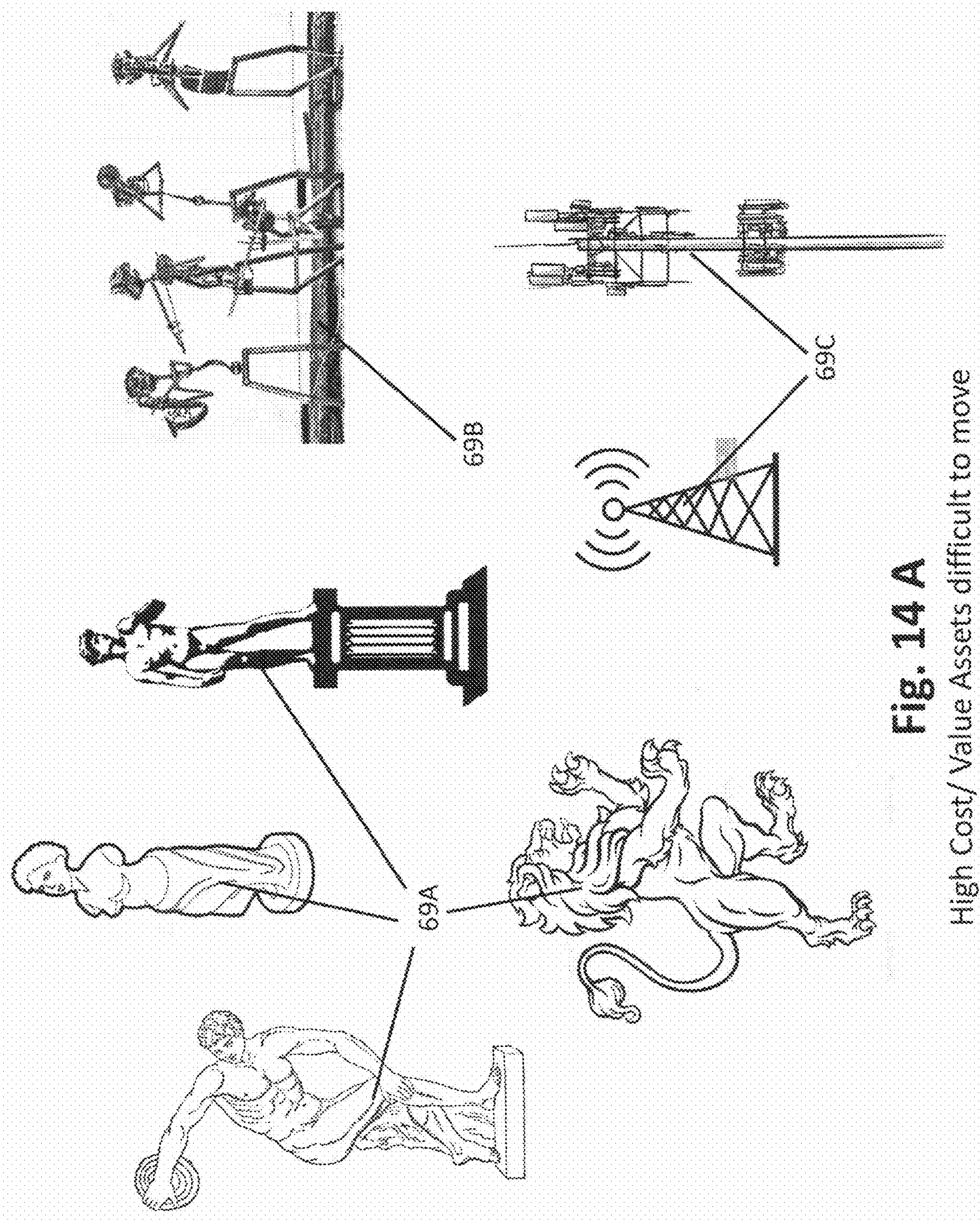
Figure 14C:
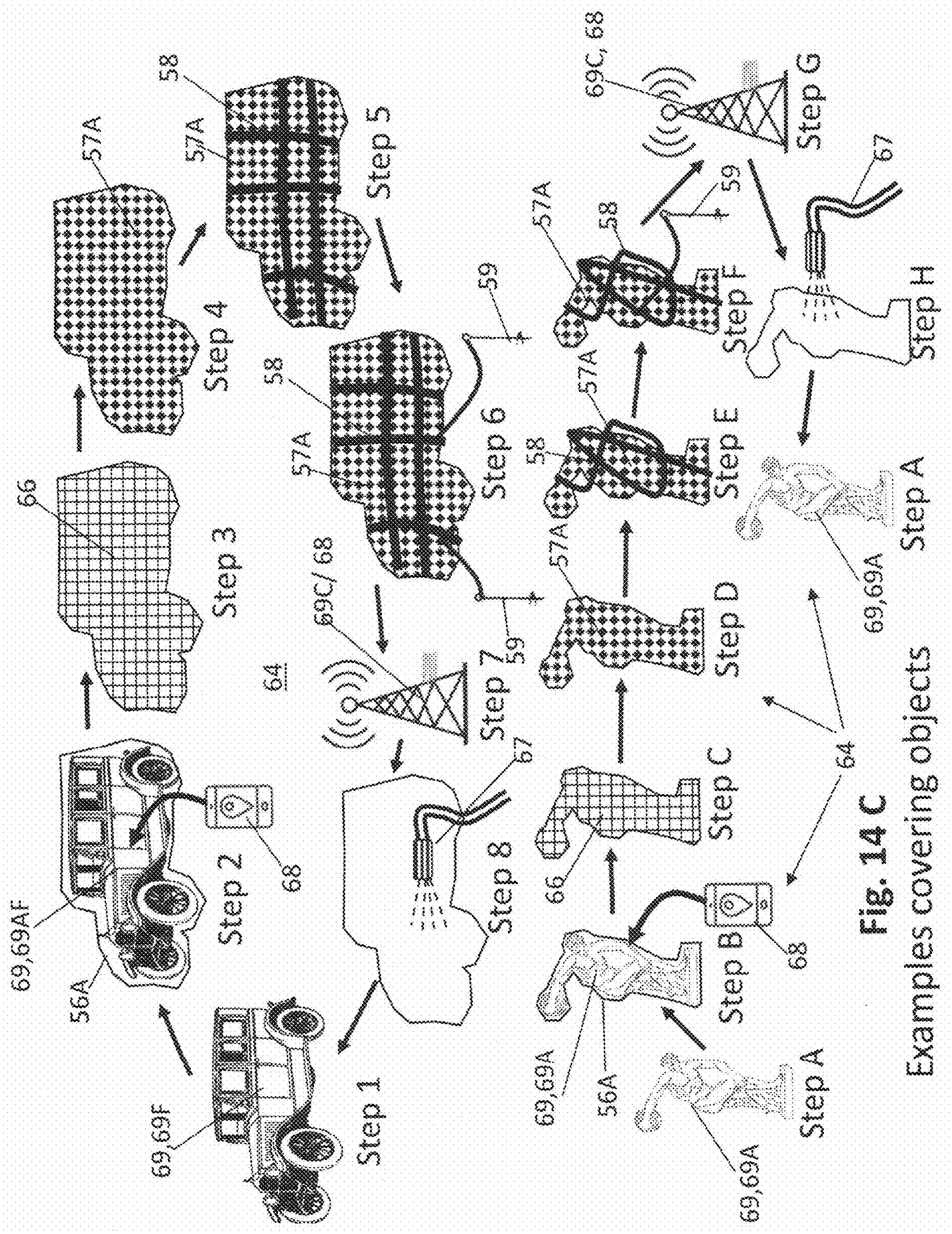

FIGS. 14A through 14C are sketches of the hurricane protection system 35 for high cost and value assets 59 with the components and features shown. Shown here are: a Hurricane protection system 35 for protecting structures from High Winds and hurricane like storms; a sealing tape 54A (like HVAC Duct® tape (optional); a pre-spray spray release coating 55; a polymer cover 56A tarp, roll/out matting, fold out matting, or water-resistant canvas with two surfaces and can have incorporate optional strengthening mesh 66; a Hurricane spray foam 57A—approximately 2 to 12 inches, with optional fire retardant additive, normally closed cell and 800 to 1400 degrees Celsius minimum resistivity; 2 pound (lb.) per cubic foot, closed cell urethane-based polymer foam at full cu ft weighs 2 lb. per cubic foot, not de-gassing; closed cell urethane-based polymer thickness 1.9 inches to 12.1 inches preferred; at least one circumferential hold down straps 58, ropes, cable, etc.; at least one anchors 59—straight legged, augers, angle legged, etc.; a prodding/push pole 59A to tuck sprayed tarp into windows, door frames, soffits and under hangs; an optional strengthening mesh 66 for high wind and hurricane resistance from high winds, by deflecting high impact flying debris-separate or incorporated as strengthening to cove 56A; a pressure sprayer 67 to clean foam 57, 57A; an optional global positioning system (GPS) transmitter 68 for tracking and finding encased objects 69 protected by the Hurricane protection system 35; a set of objects 69 for protection: including statues 69A; modern art 69B; cellular telephone towers and fixed electronics 69C; classic and collectible cars/trucks 69D; race vehicles—cars, trucks, go-karts, motorcycles etc. 69E; vehicles-cars, trucks, daily use vehicles 69E; boats-pontoons, houseboats, speedboats, sailboats, etc. 69G; and recreation vehicles and trailers 69H for example and not as a limitation. A system for high cost/value objects could protect lawn objects, outdoor items, city park objects, statues, vehicles, collectibles and all types of items that need hurricane protection. The high value can be moneywise, sentimental, historical and classical items that can not be moved out of harms way. Items may be equipped with a GPS tracker to find the object if displayed by the severe storm and calamity. The wrapped object is a floatable object encased with the tarp and foam structure. Even vehicle, boat and RV dealerships could now protect inventory, hold vehicles, service vehicles and the like from the onset of a storm. Likewise, FEMA or state emergency preparedness teams could pre-store materials at central or regional warehouses to be prepared to quickly react to a sever onslaught by a hurricane. States and Federal agencies could pre-buy materials and stage them for use. Insurance companies could save millions of dollars on claims and thereby may incentivized individuals and organizations to use the hurricane system and gain premium reductions in insurance costs.

FIGS. 15A and 15B are listings of the process to deploy protection system onto structures and high cost/value items for protection from hurricanes and high velocity debris calamities with steps and options described. These are described in the operation section below.

As can be seen, the Special Fire Protection System 30 for Runaway Grass and Forest Fires and Method 60 for Use and the Hurricane Asset Protection System 35 for preparing real estate, vehicles, and other high cost/value objects and tangible property for natural and manmade calamities and their aftermath are unique combinations and uses as described herein. Above are seen numerous innovations for fire isolation devices and storm damage reduction ideas that have been provided in the prior art that are adapted to be used. Even though these innovations may be suitable for the specific individual purposes to which they address, they would not be suitable for the purposes of the present invention as heretofore described.

The details mentioned here are exemplary and not limiting. Other specific components and manners specific to describing a Special Fire Protection System 30 for Runaway Grass and Forest Fires and Method for Use and the Hurricane Asset Protection System 35 for preparing real estate, vehicles, and other high cost/value objects and tangible property for natural and manmade calamities and their aftermath can be added as a person having ordinary skill in the field of the art of fire protection and hurricane systems and methods 62, 64 for their uses well appreciates.

Operation of the Preferred Embodiment

The Special Fire Protection System 30 for Runaway Grass and Forest Fires and Method for Use and Hurricane Asset Protection System 35 for preparing real estate, vehicles, and other high cost/value objects and tangible property for natural and manmade calamities and their aftermath have been described in the above embodiment. The manner of how the device operates is described below. One notes well that the description above and the operation described here must be taken together to fully illustrate the concept of Special Fire Protection System for Runaway Grass and Forest Fires and Method for Use and Hurricane Asset Protection System 35. The preferred embodiments of the Special Fire Protection System 31 for Runaway Grass and Forest Fires and Hurricane Asset Protection Systems 35 were described above. The methods of use is described here.

FIG. 8 is a listing of the process 60 to deploy protection system 30 onto structures for protection from runaway grass and forest fires. The Method is:

| Step | Description |
|---|---|
| 1 | Spray structure with release agent (optional) |
| 2 | Cover structure with heat reflective layer (tarp or roll matting/layered material) |
| 3 | Cover corners with wide seal tape if needed |
| 4 | Secure reflective layer with straps |
| 5 | Attach ground straps to ground anchors |
| 6 | Spray-on approximately 2 to 12 inches fire protective foam |
| 7 | Prod/press pole into window frames, soffits, under-hangs etc. as foam cures and sets-up |
| 8 | Spray on alternative intumescent coating/foam |
| 9 | Roll-on Alternative Heat retardant coating |
| 10 | Post fire - remove foam |

-continued

| Step | Description |
|---|---|
| 11 | Unsecure ground straps from anchors |
| 12 | Remove anchors |
| 13 | Remove reflective heat cover/tarp/layer |
| 14 | Pressure spray surface to remove residue if needed |

FIGS. 15A and 15B are listings of the process to deploy protection system onto structures and high cost/value items for protection from hurricanes and high velocity debris calamities with steps and options described. FIG. 15A shows for a method 62 of protecting from a hurricane a free standing residential, commercial, and/or governmental structure comprised of the following steps:

| Step | Description |
|---|---|
| 1 | Spray structure with release agent (optional) |
| 2 | Cover structure with plastic/ canvas tarp or heat reflective layer (tarp or roll) |
| 3 | Cover corners with wide seal tape |
| 3A | Encase tarp with mesh strength wrap - optional |
| 3B | Install release flap/ valve to equalize pressure in/ out - optional |
| 4 | Secure reflective layer with straps |
| 5 | Attach ground straps to ground anchors |
| 6 | Spray-on approximately 1.9 to 12.1 inches hurricane protective foam at 2 lb. per cu ft closed cell |
| 7 | Prod/ press pole into window frames, soffits, under-hangs etc. as foam cures and sets-up |
| 7A | Spray on alternative intumescent coating/ foam - optional |
| 7B | Roll-on Alternative Heat retardant coating - optional |
| 8 | Post storm - remove foam |
| 9 | Unsecure ground straps from anchors |
| 10 | Remove anchors |
| 11 | Remove reflective tarp/later and |
| 12 | Pressure spray surface to remove residue |

wherein the method when used can prevent damage to the free-standing structure and its contents from a hurricane and accompanying high velocity debris.

FIG. 15B shows for a method of protecting from a hurricane a high cost/value object comprised of the following steps:

| Step | Description |
|---|---|
| 1 | Spray structure with release agent (optional) |
| 2 | Cover and wrap object with plastic/ canvas tarp or heat reflective layer (tarp or roll) |
| 3 | Cover corners with wide seal tape and seal edges - water tight/ resistant |
| 3A | Encase tarp with mesh strength wrap - optional |
| 3B | Install optional GPS Tracker/ transmitter for tracking movement/ displacement of object |
| 3C | Install Optional anchor stake to retain object at location |
| 4 | Prod/ press pole into crevices, recesses of object for compressed fit window frames, soffits, under-hangs etc. as foam cures and sets-up |
| 5 | Secure tarp/ reflective layer with circumferential straps all directions |
| 6 | Spray-on approximately 2 to 12 inches fire protective foam - 2 lb. per cu ft |
| 7 | Post storm - recover object - |
| 7A | Track with optional GPS tracker to locate |
| 7B | Remove anchors |

-continued

| Step | Description |
|---|---|
| 8 | Remove circumferential straps |
| 9 | Remove foam and reflective tarp/ later after storm subsides |
| 10 | Pressure spray surface to remove residue if needed |

wherein the method when used can prevent damage to high cost/value objects from a hurricane and accompanying high velocity debris.

Many uses are anticipated for the Special Fire Protection System 30 for Runaway Grass and Forest Fires and Method for Use as well as the Hurricane Protection System 35. Some examples, and not limitations, are shown in the following Table.

| ITEM | DESCRIPTION |
|---|---|
| 1 | multi-level residential |
| 2 | single level residential |
| 3 | commercial buildings |
| 4 | schools and government buildings |
| 5 | barns and ranch outbuildings |
| 6 | strip malls |
| 7 | convenience stores |
| 8 | power transmission line towers |
| 9 | cellular telephone towers |
| 10 | statues, gazebos, pool houses |
| 11 | garages, stables, and workshops |
| 12 | barns, outbuildings |
| 13 | high cost/ high value items - statues 69A, modern art 69B, cellular telephone towers and fixed electronics 69C |
| 14 | vehicles - cars, trucks, daily use vehicles 69E |
| 15 | classic and collectible cars/ trucks 69D |
| 16 | boats - pontoons, houseboats, speedboats, sailboats, etc. 69G |
| 17 | Recreation vehicles and trailers 69H |
| 18 | race vehicles - cars, trucks, go-karts, motorcycles etc. 69E |
| 19 | Car dealerships/ factory inventory holds |

With this description it is to be understood that the Special Fire Protection System 30 for Runaway Grass and Forest Fires and Method for Use 60 and Hurricane Asset Protection System 35 for preparing real estate, vehicles, and other high cost/value objects and tangible property for natural and manmade calamities and their aftermath is not to be limited to only the disclosed embodiment of product. The features of the Special Systems 30 and 35 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed considering the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

What is claimed is:

1. A hurricane protection system (35) for protecting a free-standing structure that is a residential structure, a commercial structure, or a governmental structure from a hurricane and high velocity debris, the system is configured to be fabricated and later removed after a hurricane ends, and is comprising of:

(a) a cover (56A) with two surfaces, the cover is configured to fully encase an exterior of the free-standing structure with a water-resistant seal of the cover (56A) completed using a sealing tape (54A);

(b) at least one circumferential hold down strap (58) placed vertically to the ground and externally to the cover (56A) and at least one hold down strap placed horizontally to the ground, placed encircling the free-standing structure, and placed externally to the cover (56A);

(c) a series of anchors (59) placed into the ground and one of the anchors attached to each end of the at least one hold down strap (58) placed vertically;

(d) a set of corner bands (54), each corner band of the set placed at a respective external corner of the free-standing structure and sealed with the sealing tape (54A);

(e) a wind and debris resistant spray foam (57A) comprised of a closed cell urethane-based polymer foam at approximately 2 pounds per cubic foot, layered between 1.9 inches and 12.1 inches in thickness, the spray foam (57A) fully encasing the cover (56A), the at least one hold down strap, the anchors, and the sealing tape (54A); and (f) a prodding/push pole (59A) to tuck the hurricane spray foam (57A) and the cover (56A) into a window, a door frame, a soffit, and an under-hangs of the free-standing structure wherein the system (35) is configured to be individually installed into a position to completely isolate the free-standing structure from the hurricane and high velocity debris; wherein the cover is manufactured in sizes configured to fit the free-standing structures; and wherein upon installation, the system (35) mitigates and prevents hurricane and high velocity debris damage to the free-standing structure and the contents thereof.

2. The hurricane protection system (35) as described in claim 1 further comprising a series of corner bands (54).

3. The hurricane protection system (35) as described in claim 1 wherein the cover is selected from a group consisting of a tarp, a roll-out mat, and a fold-out mat.

4. The hurricane protection system (35) as described in claim 1 wherein the cover (56A) is selected from a group consisting of a polymer/plastic sheet and a canvas water sheet.

5. The hurricane protection system (35) as described in claim 1 wherein the cover is further comprised with a set of grommets for ease of installation.

6. The hurricane protection system (35) as described in claim 1 wherein the cover is further comprised with a strengthening mesh (66).

7. The hurricane protection system (35) as described in claim 1 further comprising a pre-spray release coating (55) on an outer surface of the cover (56A).

8. The hurricane protection system (35) as described in claim 1 wherein the hurricane spray foam (57A) is further comprising a configuration of normally closed cells.

9. The hurricane protection system (35) as described in claim 1 wherein the series of anchors (59) is selected from a group consisting of straight legged stakes, augers, and angle-legged stakes.

10. The hurricane protection system (35) as described in claim 1 wherein the hurricane cover (56A) is further comprising a release flap/valve/section (61) wherein in a high pressure conditions, the release flap permits the system (35) to equalize an inside and an outside air pressure.

11. A hurricane protection system (35) for protecting a high cost/value object (59A) from a hurricane and high velocity debris, the system is configured to be fabricated and later removed after a hurricane ends, and is comprising of:

(a) a cover (56A) with two surfaces, the cover is configured to fully encase an exterior of the high cost/value object with water-resistant seal of the cover (56A) completed using a sealing tape (54A);

(b) at least one circumferential hold down strap (58) placed vertically to the ground and externally to the cover (56A) and at least one hold down strap placed horizontally to the ground, placed encircling the free-standing structure, and placed externally to the cover (56A);

(c) a series of anchors (59) placed into the ground and one of the anchors attached to each end of the at least one hold down strap (58) placed vertically;

(d) a set of corner bands (54), each corner band of the set placed at a respective external corner of the free-standing structure and sealed with the sealing tape (54A);

(e) a wind and debris resistant spray foam (57A) comprised of a closed cell urethane-based polymer foam at approximately 2 pounds per cubic foot, layered between 1.9 inches and 12.1 inches in thickness, the spray foam (57A) fully encasing the cover (56A), the at least one hold down strap, the anchors, the corner bands (54), and the sealing tape (54A); and the sealing tape (54A); and (f) a prodding/push pole (59A) to tuck the hurricane spray foam (57A) and the cover (56A) into a group of curves and recesses of the high cost/value object wherein the system (35) is configured to be individually installed into a position to completely isolate the high cost/value object from the hurricane and high velocity debris; wherein the cover is manufactured in sizes configured to fit the high cost/value object; and wherein, upon installation, the system (35) mitigates and prevents hurricane and high velocity debris damage to the high cost/value object.

12. The hurricane protection system (35) as described in claim 11 wherein the cover is selected from a group consisting of a tarp, a roll-out mat, and a fold-out mat.

13. The hurricane protection system (35) as described in claim 11 wherein the cover is selected from a group consisting of a polymer/plastic sheet and a canvas water sheet.

14. The hurricane protection system (35) as described in claim 11 wherein the cover is further comprised with a strengthening mesh (66).

15. The hurricane protection system (35) as described in claim 11 further comprising a pre-spray release coating (55) on an outer surface of the cover (56A).

16. The hurricane protection system (35) as described in claim 11 wherein the hurricane spray foam (57A) is further comprising a configuration of normally closed cells.

17. The hurricane protection system (35) as described in claim 11 wherein the system is further comprised of a global positioning system (GPS) transmitter (68) for tracking and finding an encased objects (69).

* * * * *